Feb. 23, 1932.  A. T. KOPPE  1,846,972
PRECISION COPYING CAMERA
Filed Nov. 28, 1927  14 Sheets-Sheet 3
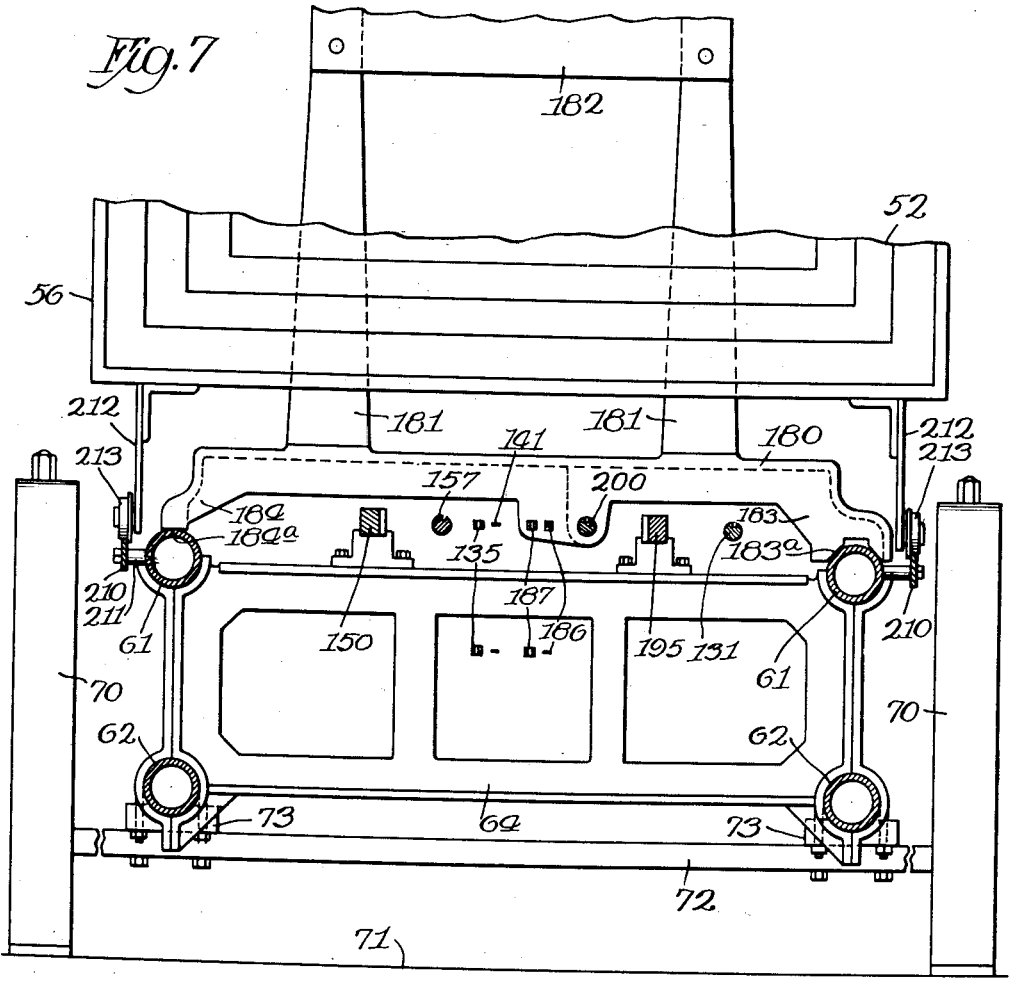
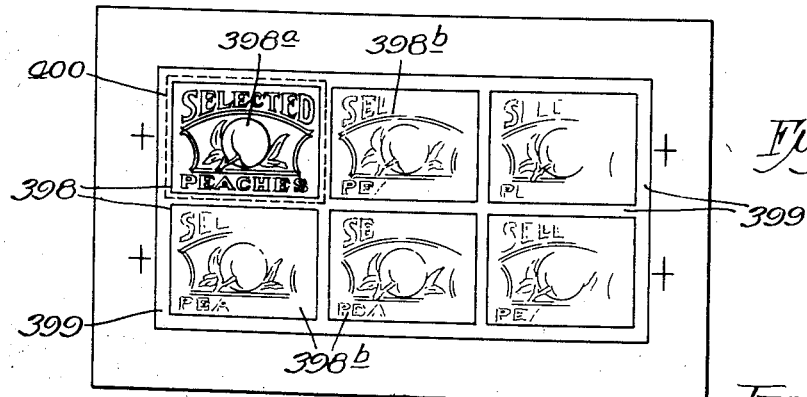
Inventor
Alexander T. Koppe
By Rector, Hibbey, Davis & Macauley, Attys.

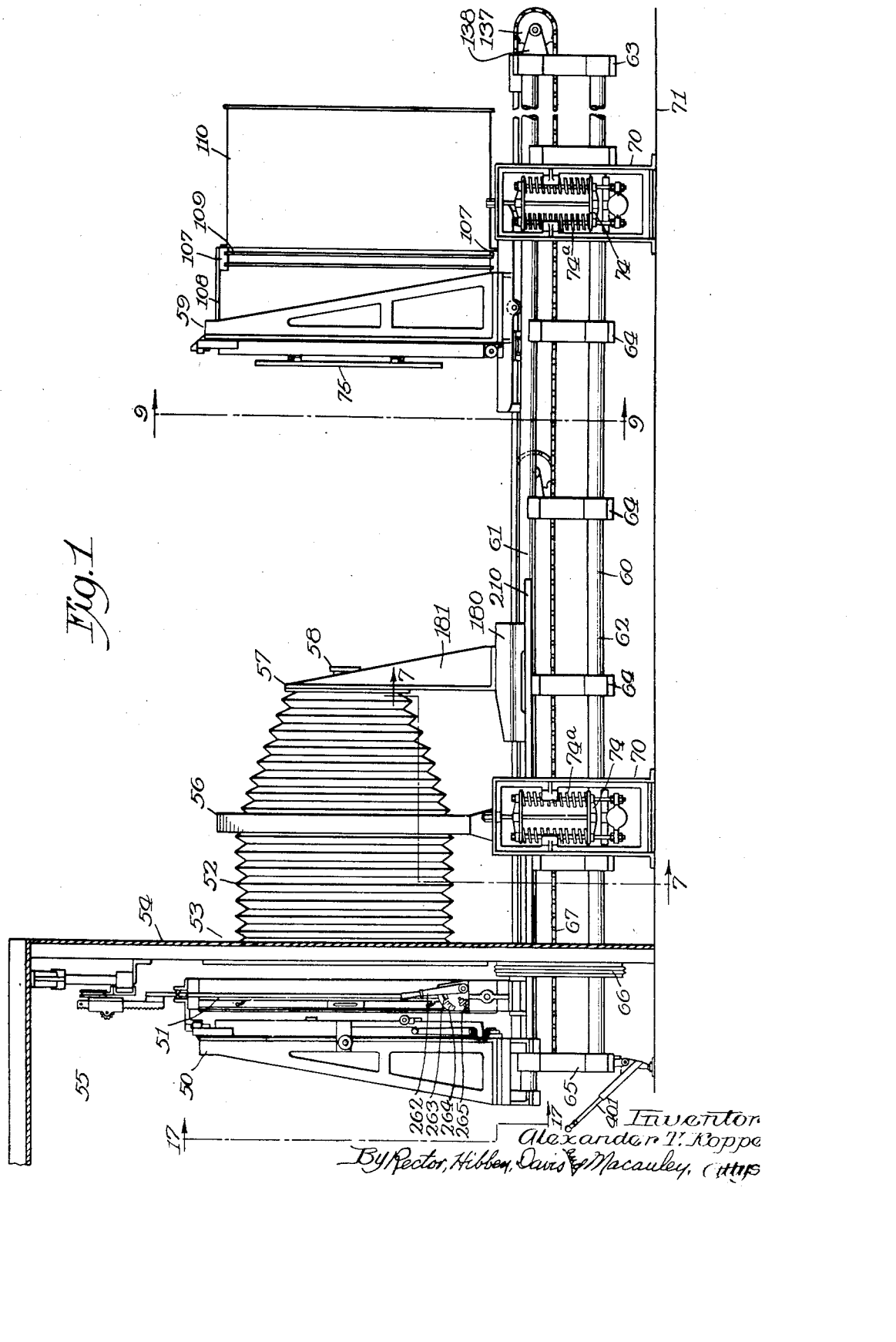

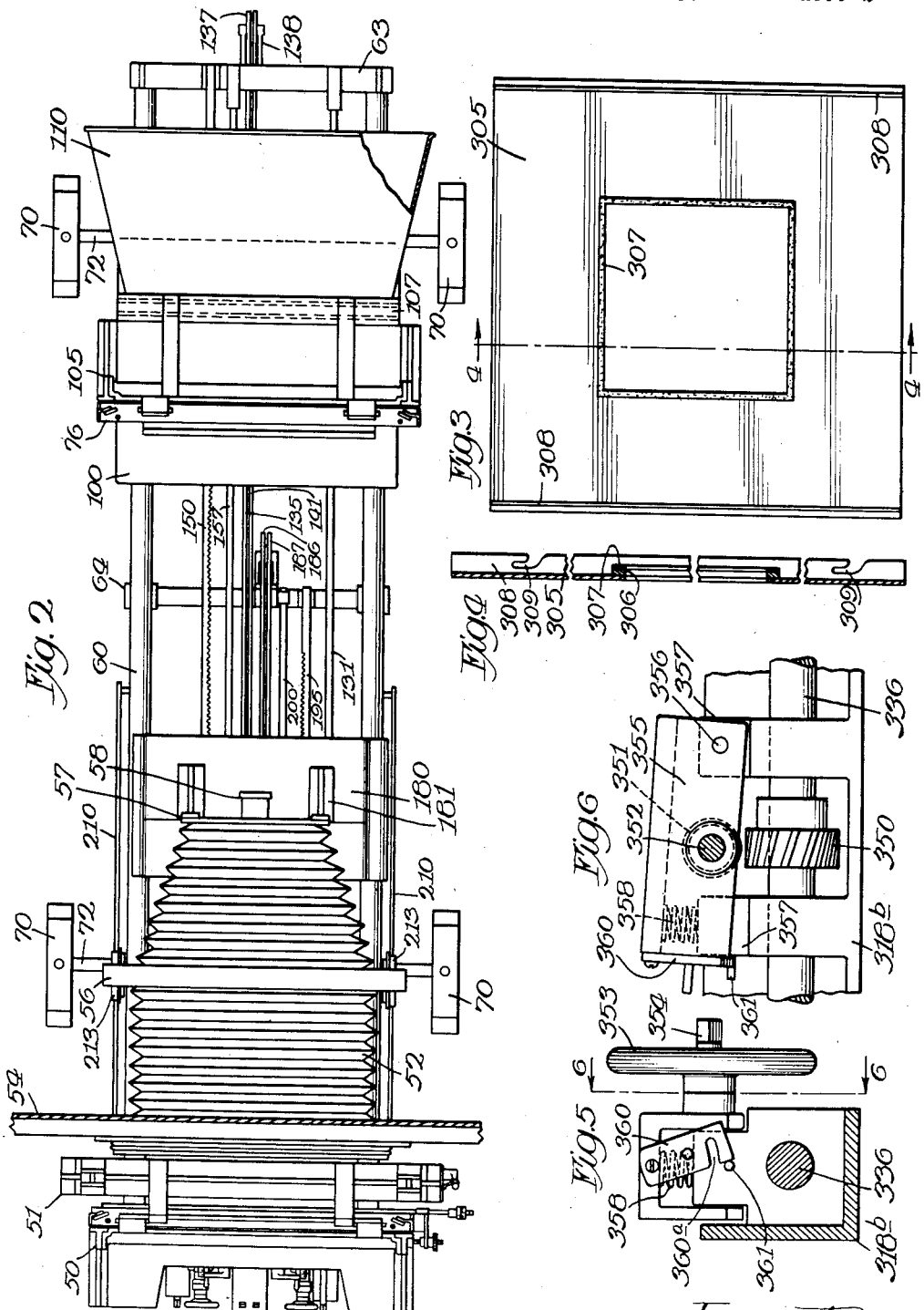

Feb. 23, 1932.  A. T. KOPPE  1,846,972
PRECISION COPYING CAMERA
Filed Nov. 28, 1927  14 Sheets-Sheet 4
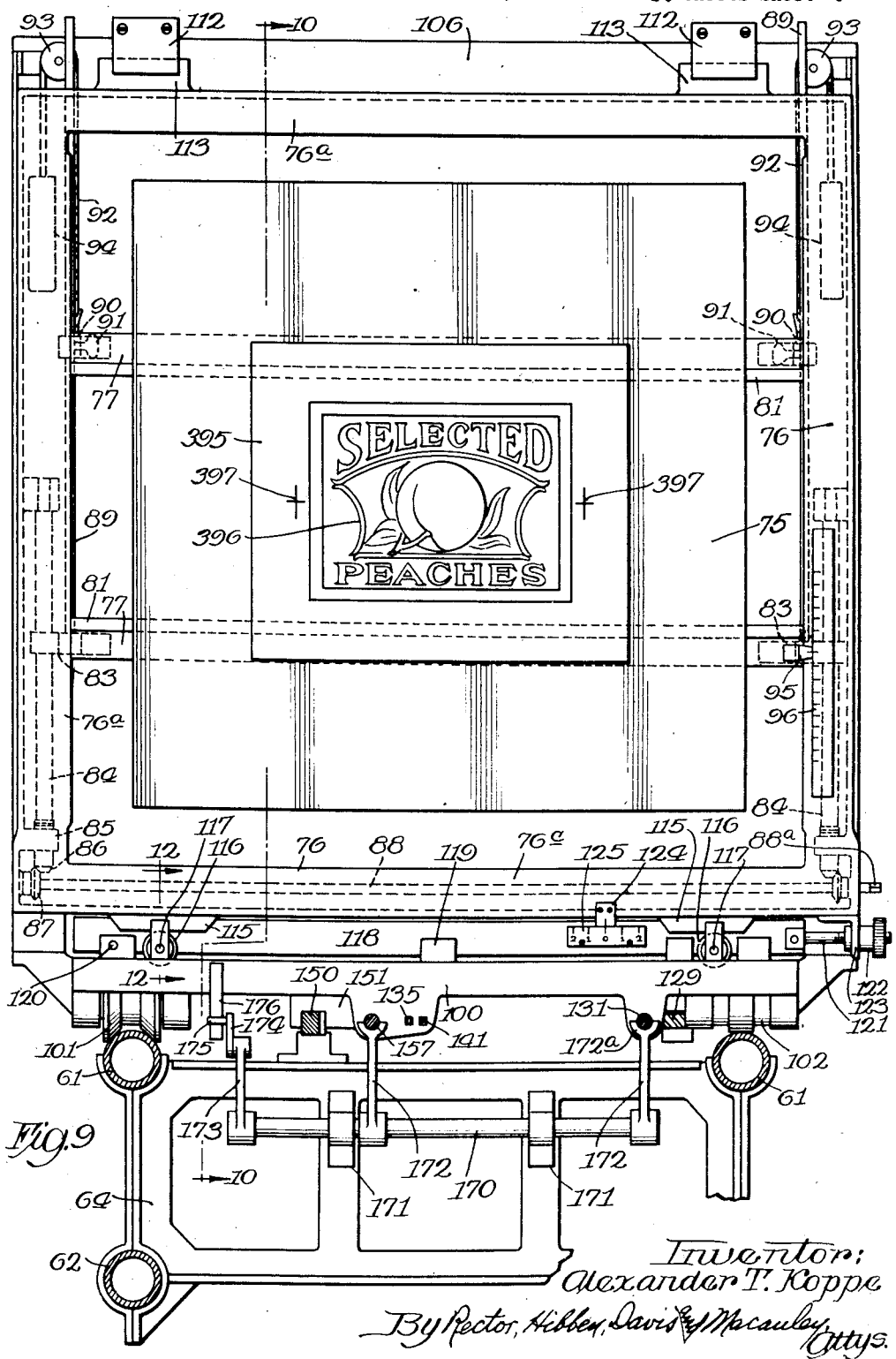

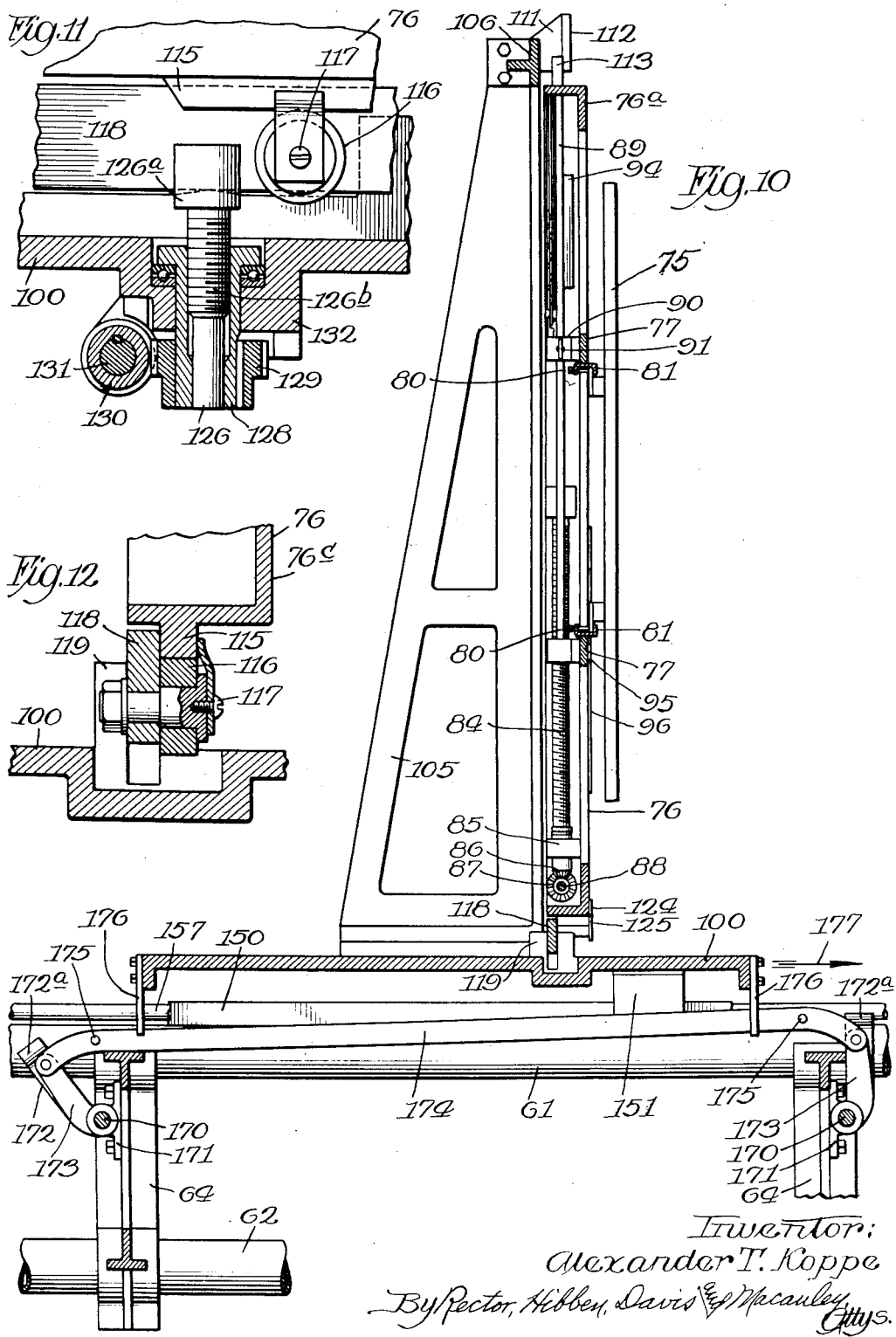

Feb. 23, 1932. A. T. KOPPE 1,846,972
PRECISION COPYING CAMERA
Filed Nov. 28, 1927 14 Sheets-Sheet 6
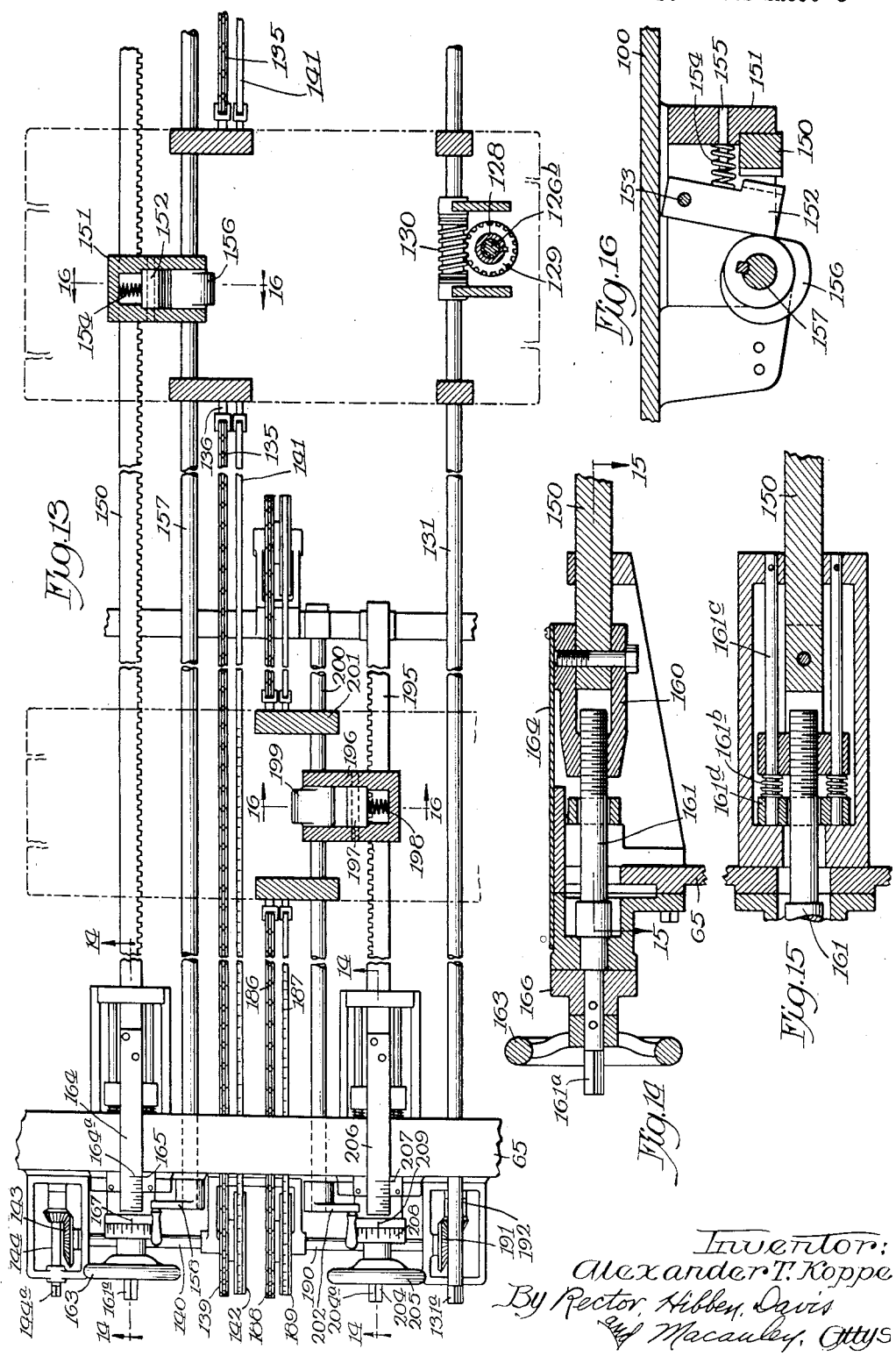
Inventor:
Alexander T. Koppe
By Rector, Hibben, Davis
and Macauley, Attys

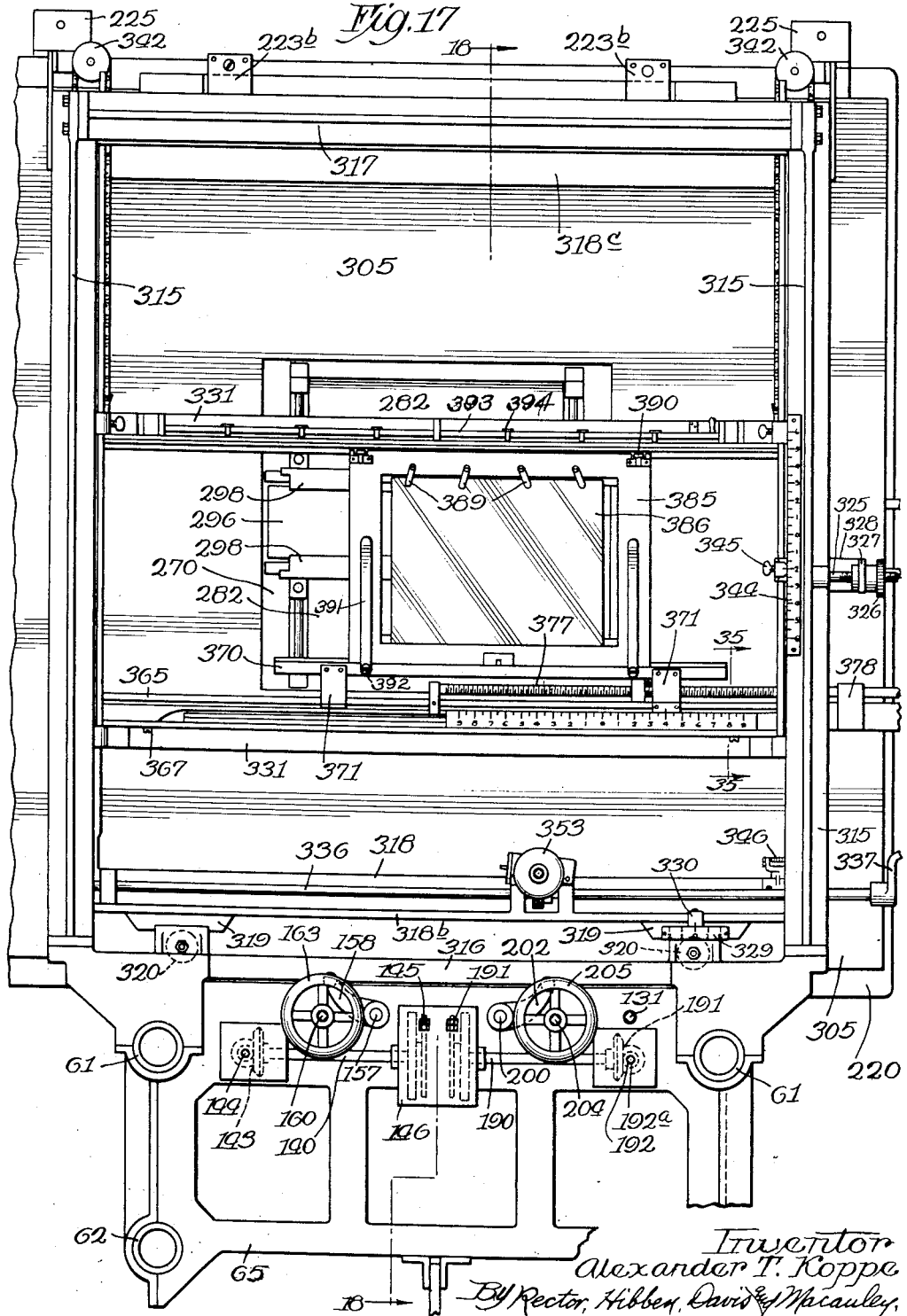

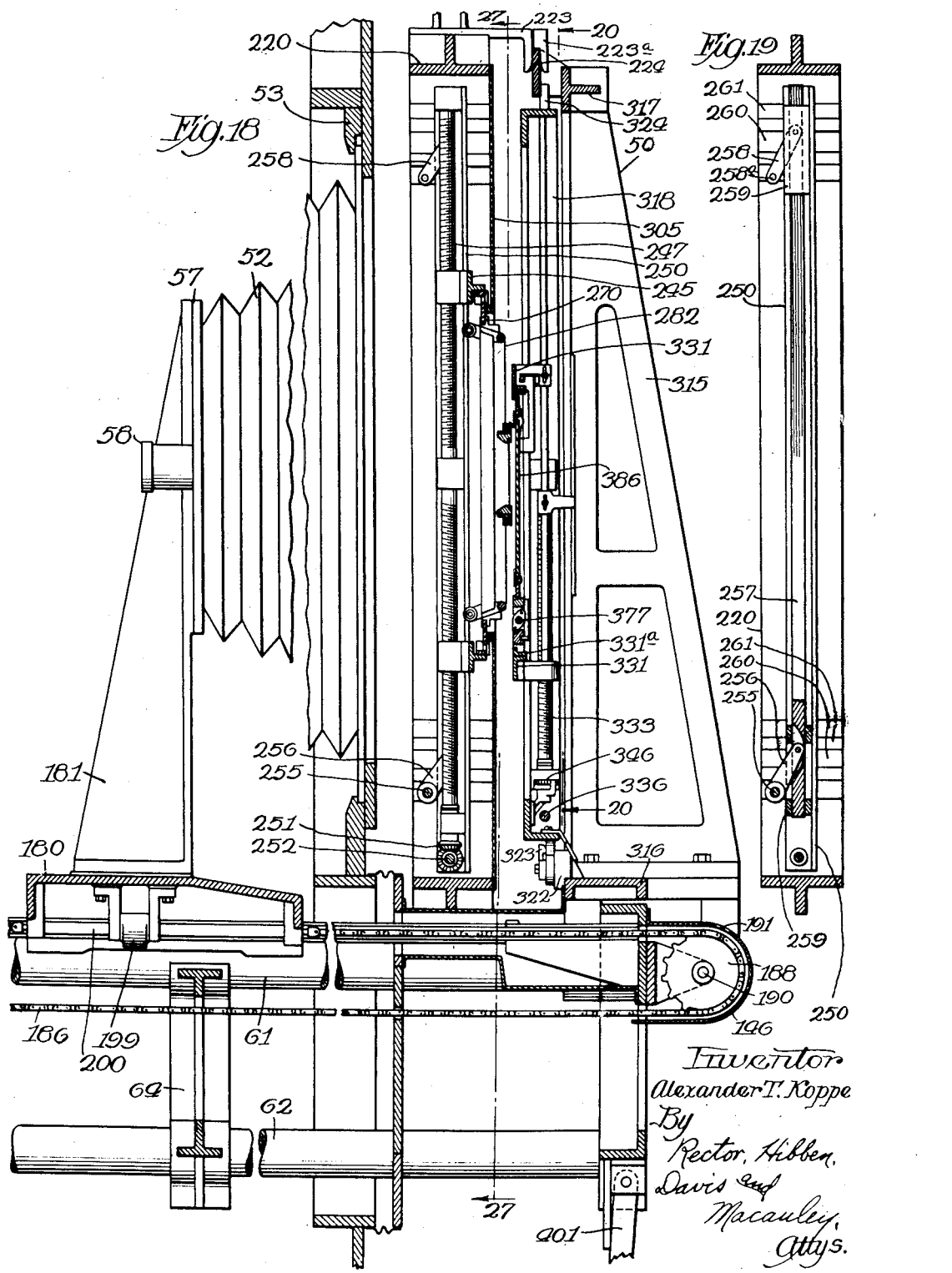

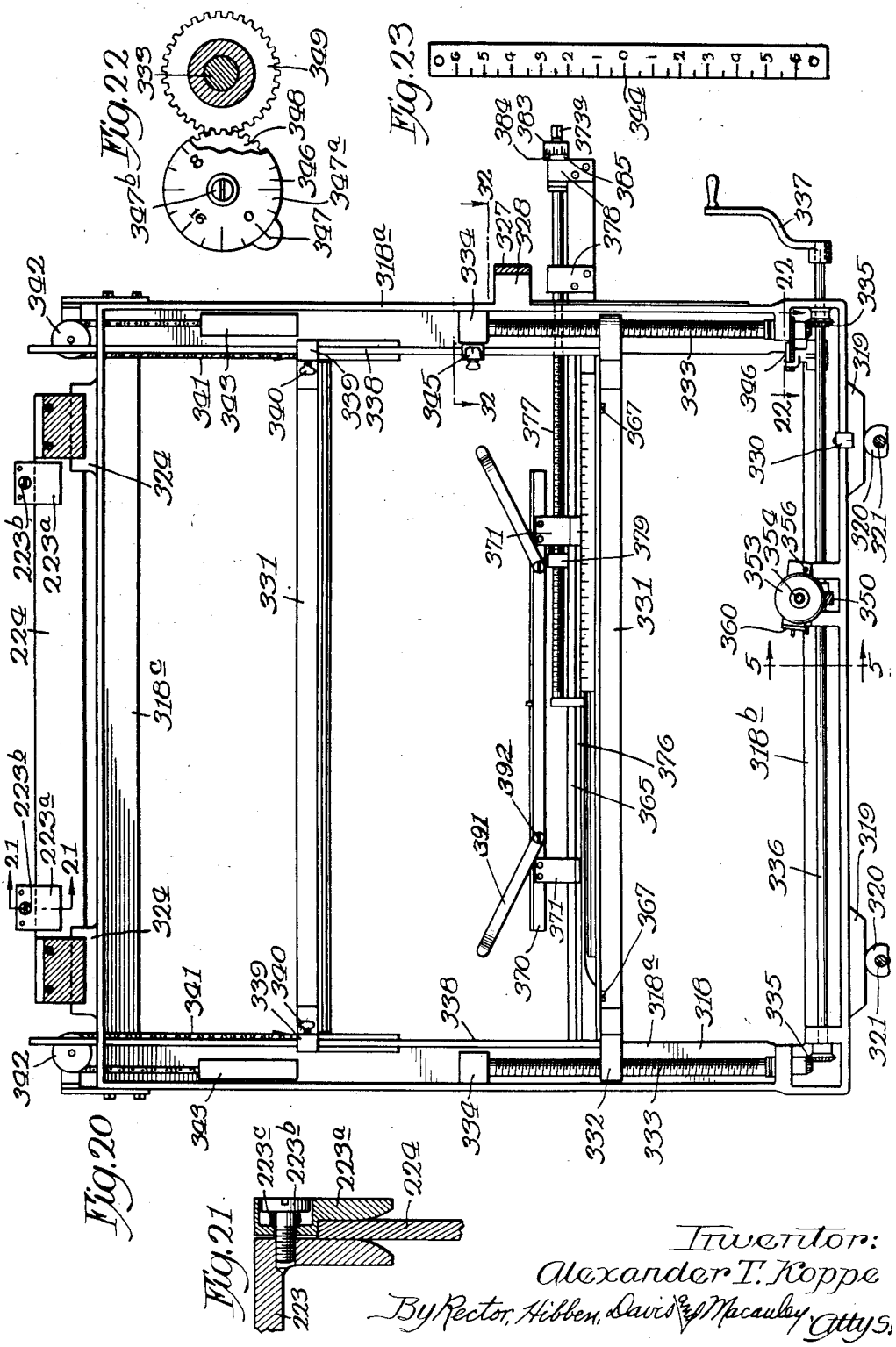
Feb. 23, 1932. A. T. KOPPE 1,846,972
PRECISION COPYING CAMERA
Filed Nov. 28, 1927 14 Sheets-Sheet 9
Inventor:
Alexander T. Koppe
By Rector, Hibben, Davis & Macauley, Attys.

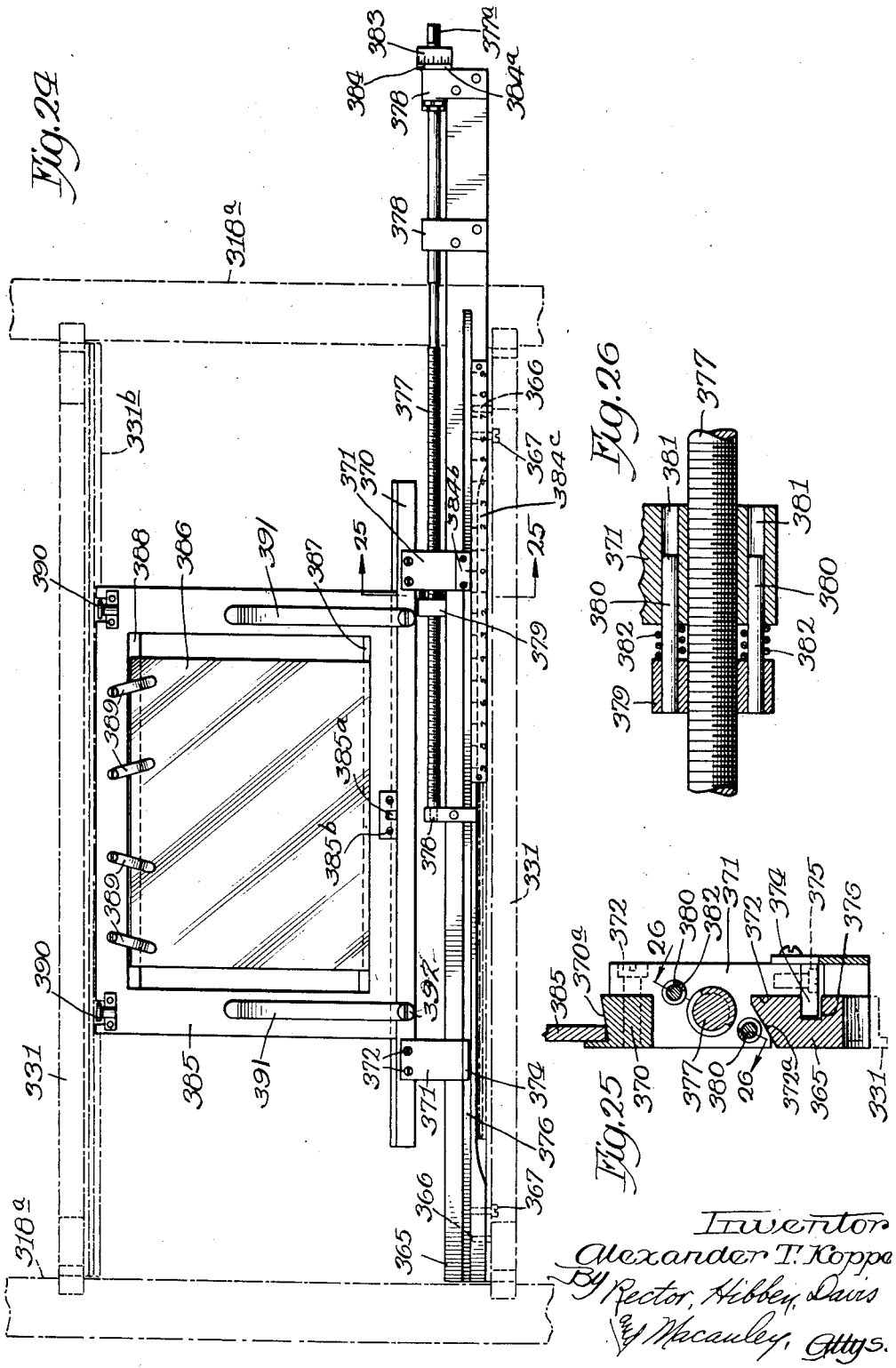

Feb. 23, 1932.  A. T. KOPPE  1,846,972
PRECISION COPYING CAMERA
Filed Nov. 28, 1927    14 Sheets-Sheet 11
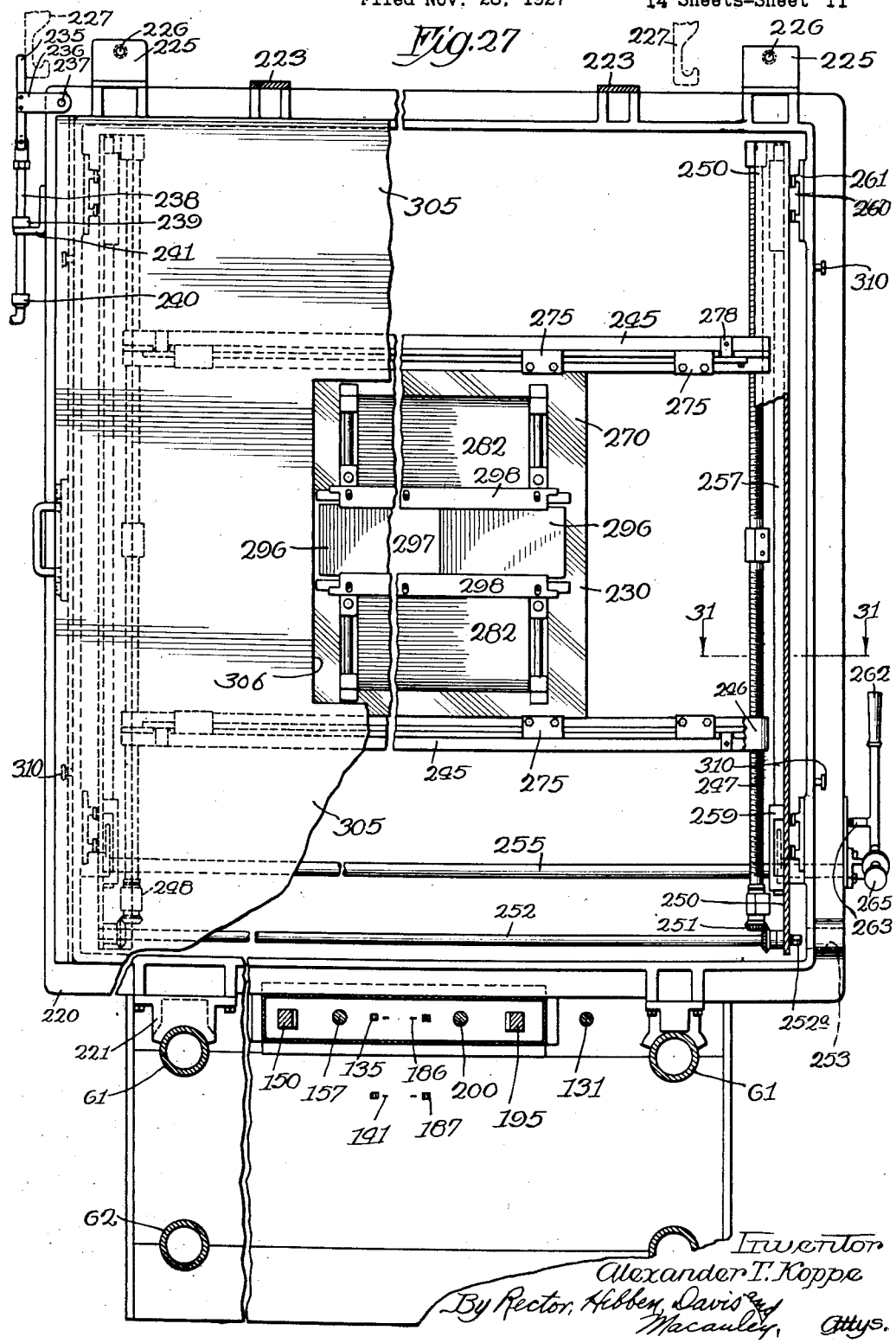
Inventor
Alexander T. Koppe
By Rector, Hibben, Davis and Macauley, Attys.

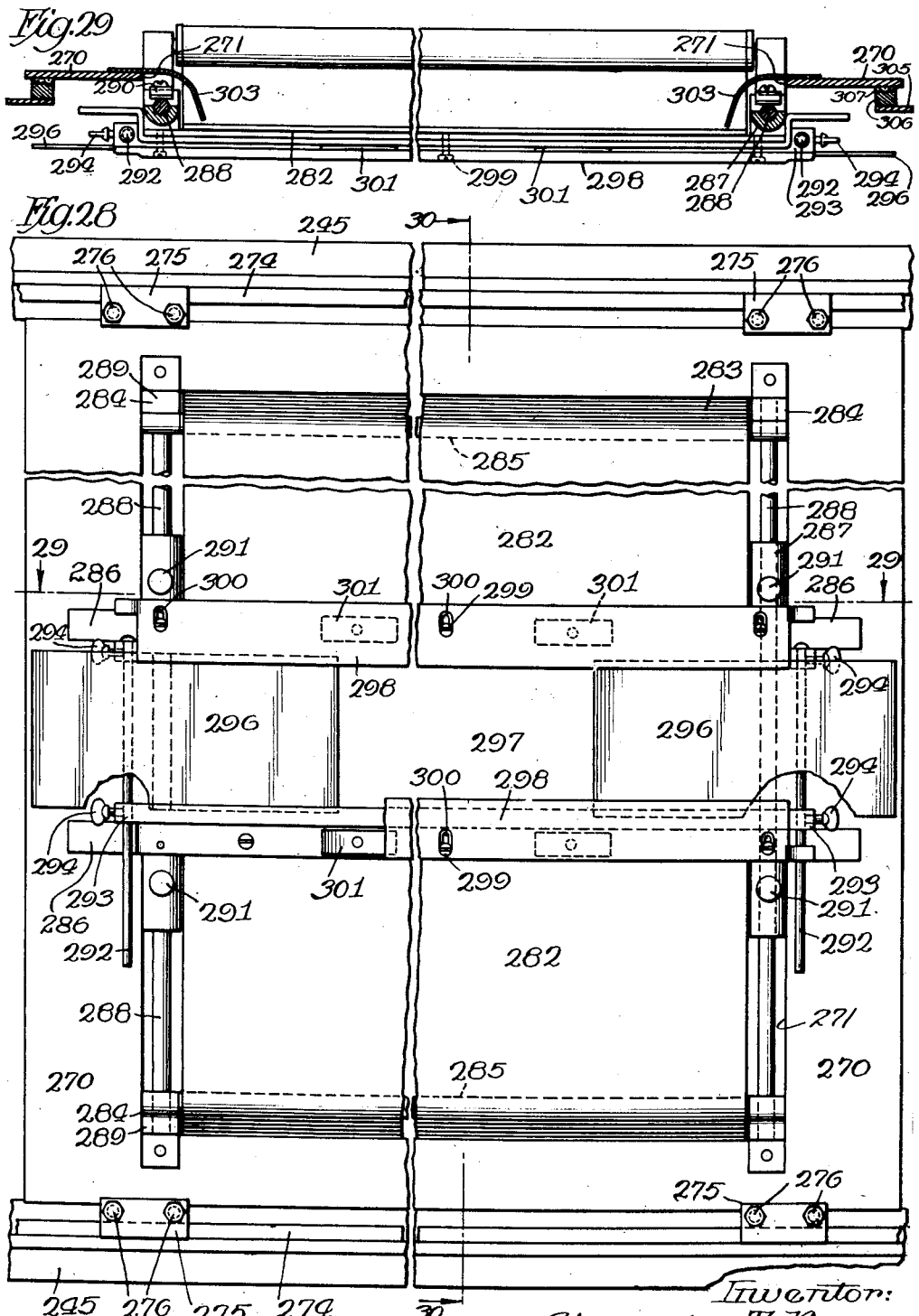

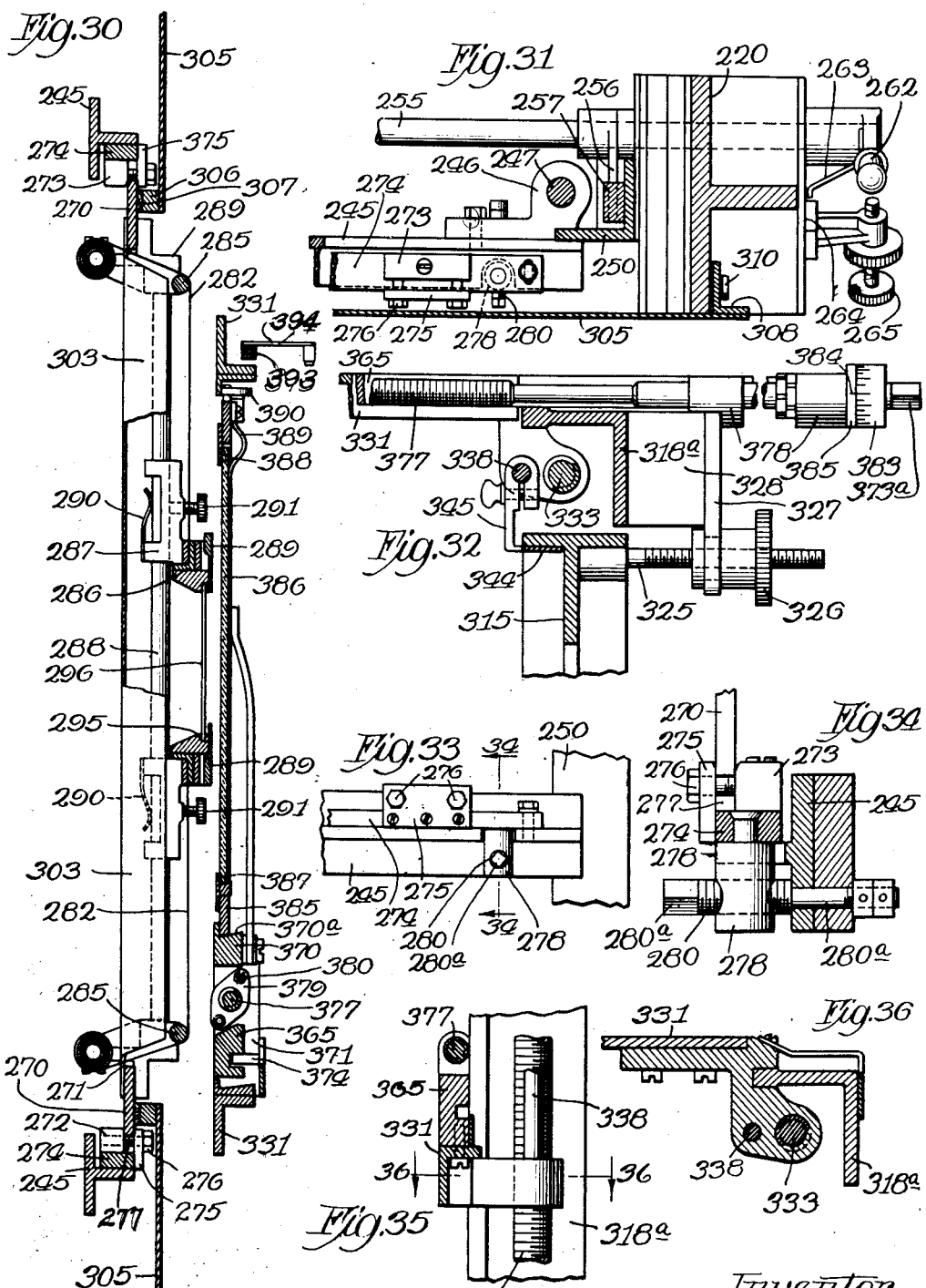

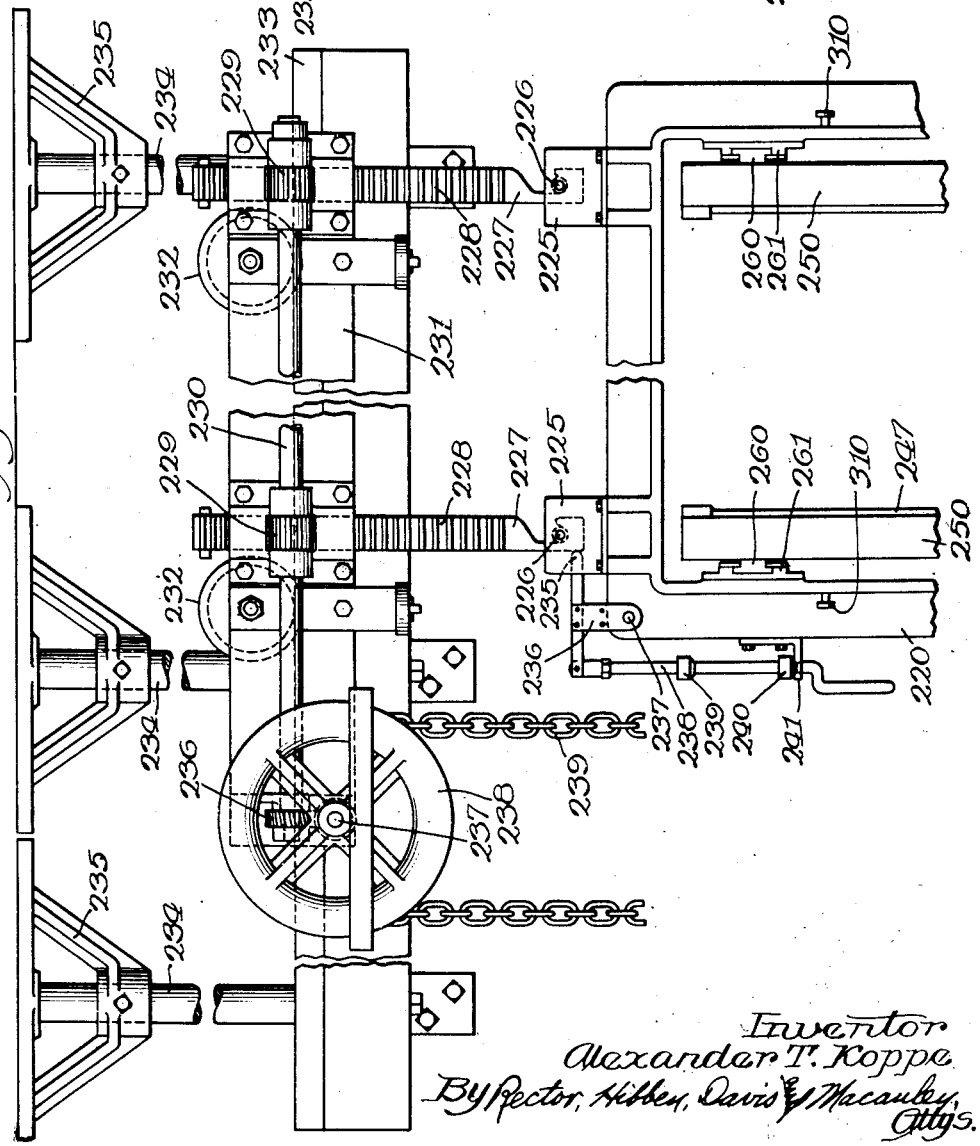

Patented Feb. 23, 1932

1,846,972

UNITED STATES PATENT OFFICE

ALEXANDER T. KOPPE, OF CHICAGO, ILLINOIS, ASSIGNOR TO DIRECTOPLATE CORPORATION, OF CHICAGO, ILLINOIS, A CORPORATION OF ILLINOIS

PRECISION COPYING CAMERA

Application filed November 28, 1927. Serial No. 236,187.

This invention relates to precision cameras and the apparatus described and claimed in the present application is an improvement on the camera covered in my prior co-pending application Serial No. 142,742, filed October 19, 1926, in which prior application many of the features described herein are claimed.

The purpose of the present invention is to provide an improved precision camera for photographically reproducing, with or without increase or decrease in size, a subject carried by either transparent or opaque sheets, in such a manner that the various subjects or subject parts will be precisely located in definite positions to register exactly with each other in size, position and relative location, and a particular object of the present invention is to provide an improved precision camera peculiarly adapted for multiple reproduction, that is, for the production of a plurality of subjects on the same negative plate. The invention may be employed with particular advantage in the lithographic and printing arts for reproducing and effecting the necessary color separation of the various parts of each unit of a multi-subject copy or design which is to be reprinted in various colors, with or without enlargement or decrease in size, by the use of a plurality of negatives each containing in proper position the parts of composite multi-subjects which are to be printed in one color.

An important object of the invention is to provide a precision camera comprising a copy holder on which the subject is mounted, a lens carrier, a screen or mask holder, and a plate holder, in combination with improved means for effecting the individual adjustment and relative adjustment of these parts to bring about the projection and photography of a number of subjects. A further important object of the invention is to provide a precision camera comprising a copy holder and a lens carrier in combination with a negative holder and a mask so arranged that the negative may be adjusted laterally and vertically to receive different parts of the subject carried by the copy board and in conjunction with means for adjusting the mask to project the desired parts of the subject on a predetermined area of the negative plate. A further object is to provide a copy holder, a lens carrier, a mask and a negative holder, in combination with means for adjusting all of these parts to secure the proper relative axial positions, angular locations and spaced relations of the parts to effect the proper projection upon the negative plate of desired selected areas of the subject carried by the copy holder. A further object is to provide a precision camera having an improved masking device for controlling the passage of light rays from selected areas of the subject to be reproduced to certain areas of the negative plate on which a single or a multiple reproduction of the subject is to be effected. Still another object is to provide a plate holder having improved means for effecting lateral adjustment of the negative holding frame to permit the multiple reproduction of a subject at various points over the surface of the negative without destroying the proper alignment of the axes of the negative plate with respect to the vertical and horizontal axes of the copy board and the subject carried thereby. A further feature of the invention is the provision of a camera stand having a negative holding frame thereon in combination with negative holding means which is independently adjustable to permit the multiple reproduction of a subject without effecting transverse movement of the negative holding frame on the camera stand. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of a precision camera embodying the improvements of the present invention;

Fig. 2 shows a top plan view of the camera illustrated in Fig. 1;

Fig. 3 shows a front elevation of the cover plate which is embodied in the screen holder or mask holder of the camera for serving as a part of the masking means;

Fig. 4 shows a detail section taken on the line 4—4 of Fig. 3;

Fig. 5 is a detail sectional view taken on the line 5—5 of Fig. 20, illustrating the clutch mechanism for controlling the operation of the fine adjusting means for effecting vertical movement of the negative plate within the negative holding frame;

Fig. 6 is a sectional view taken on the line 6—6 of Fig. 5 showing an elevation of the major parts of the clutch mechanism shown in the latter figure;

Fig. 7 is a transverse section taken on the line 7—7 of Fig. 1, showing an elevation of the bellows support and associated parts;

Fig. 8 is a somewhat diagrammatic view illustrating the parts of a subject which is to be reproduced in multiple on the negative carried by the negative holder;

Fig. 9 shows an enlarged elevation, looking toward the front of the camera, of the copy board holding frame and associated mechanism by which the copy holder may be tilted transversely of the longitudinal axis of the camera;

Fig. 10 is a vertical section taken on the line 10—10 of Fig. 9;

Fig. 11 is a detail section taken transversely of the camera illustrating the mechanism by which the tilting of the copy holding frame is effected;

Fig. 12 is a detail sectional view taken on the line 12—12 of Fig. 10, showing the mounting of the copy board holding frame on the copy board carrier;

Fig. 13 is a horizontal section taken longitudinally of the camera illustrating the operating mechanism for effecting adjustment of the copy board holder, the lens carrier and other parts of the camera;

Fig. 14 is a detail sectional view taken on the line 14—14 of Fig. 13 illustrating the mechanism for effecting longitudinal adjustment of the copy board holder and other parts;

Fig. 15 is a detail sectional view taken on the line 15—15 of Fig. 14;

Fig. 16 is a detail sectional view taken on the line 16—16 of Fig. 13 illustrating cam-operated mechanism for controlling the driving connection with one of the longitudinally adjustable rack bars;

Fig. 17 is a transverse section taken on the line 17—17 of Fig. 1 illustrating an elevation from the rear of the camera of the negative frame holder embodying the adjustable features of the present invention for permitting the multiple reproduction of the subject on the negative;

Fig. 18 is a section taken longitudinally of the camera on the line 18—18 of Fig. 17, showing the negative holding frame and associated parts, the mask holding frame and associated parts, the bellows support, and the lens carrier together with other parts of the operating mechanism of the camera;

Fig. 19 is a vertical sectional view illustrating the mechanism for effecting adjustment of the screen or mask holder in the screen housing or frame;

Fig. 20 is a sectional view taken on the line 20—20 of Fig. 18 illustrating, in elevation, the negative holding frame and associated parts, with the negative holder proper removed therefrom;

Fig. 21 is a detail sectional view taken on the line 21—21 of Fig. 20 illustrating the means for detachably connecting the screen or mask housing with the upper part of the negative frame support;

Fig. 22 is a detail section showing the micrometer device for effecting a fine vertical adjustment of the negative plate holding bars;

Fig. 23 is an elevation view of the scale attached to the side of the negative holding frame for indicating the vertical position of the negative in the holder;

Fig. 24 is an enlarged elevation from the rear of the camera of the auxiliary attachment carried by the negative holding frame for permitting lateral adjustment of the negative without effecting lateral adjustment of the negative holding frame on the camera stand;

Fig. 25 is a detail section on the line 25—25 of Fig. 24 showing an enlarged view of the lower negative plate holding bar;

Fig. 26 is a detail section taken on the line 26—26 of Fig. 24 illustrating the take-up mechanism in the adjusting device for effecting lateral adjustment of the negative frame;

Fig. 27 is a section taken transversely of the camera on the line 27—27 of Fig. 18, showing an elevation from the rear of the camera of the screen or mask holding frame and associated parts;

Fig. 28 shows an enlarged elevation of the mask proper carried by the mask holding frame illustrated in Fig. 27;

Fig. 29 is a detail horizontal section taken on the line 29—29 of Fig. 28;

Fig. 30 is a detail sectional view taken on the line 30—30 of Fig. 28 showing the construction of the mask and cover plate and also a sectional view through the adjacent negative frame and its holder;

Fig. 31 is a detail section taken on the line 31—31 of Fig. 27;

Fig. 32 is a detail section taken on the line 32—32 of Fig. 20;

Fig. 33 is a detail rear elevation of the clamps and holding bars for the mask frame shown in Fig. 28;

Fig. 34 is a detail section taken on the line 34—34 of Fig. 33;

Fig. 35 is a detail section taken on the line 35—35 of Fig. 17;

Fig. 36 is a detail section taken on the line 36—36 of Fig. 35;

Fig. 37 is an enlarged rear elevation of the housing mechanism for elevating the screen mask or frame out of its position in the camera and returning it to that position, and Fig. 38 is a side elevation of the mechanism illustrated in Fig. 37.

Generally speaking, the principal parts of the camera include the negative holder frame 50 located normally at the rear end of the screen or mask housing 51 and arranged to receive light through a bellows 52 which has its rear end supported by a flange or strip 53 around the aperture in the vertical wall 54 of the dark room 55 in which the negative holding frame and the screen or mask housing are located. The bellows 52 is mounted at an intermediate point on the bellows support 56 and the forward end of the bellows is connected to the lens carrier 57 having mounted therein the usual lens board carrying a lens 58 which is provided with a removable cap and other features common to lenses intended for this purpose. In addition to these principal parts, the camera includes a copy board carrier 59 which is mounted, together with the negative holder frame, the mask or screen housing, the bellows support and the lens carrier, on the camera stand 60. This stand comprises four longitudinal tubular frame members of cylindrical cross-section including two upper frame members 61 and two lower frame members 62, the top member 61 being adapted to serve as rails to support the copy board carrier and the lens carrier in their travel and to support other parts of the camera, as hereinafter described. The rails 61 and 62 are connected at the front end of the camera by a front supporting truss frame 63 and they are connected at a plurality of intermediate points by intermediate truss frames 64. The rear ends of the rails 61 and 62 are connected by the rear truss frame member 65 which is located within the dark room. The rails 61 and 62 extend through an aperture in the vertical wall 54 of the dark room and the passage of light through this opening around the parts of the camera stand and adjacent parts of the camera is prevented by a light excluding shield or bellows 66 and by a sheet metal frame or housing 67 which partially encloses the upper rails 61 and adjacent parts of the operating mechanism of the camera for some distance outwardly from the wall 54. These light excluding means permit the rear end of the camera stand to be moved relatively to the dark room wall while at the same time excluding light from the interior of the dark room.

The negative holder frame or housing 50, the screen or mask housing 51, the lens carrier 57 and the copy board carrier 59 are provided with certain adjusting mechanism, as hereinafter described, for securing the desired relative positions of the parts with respect to the lens and for the purpose of securing the desired enlargement or reduction in the size of the subject being reproduced, as well as to permit the multiple reproduction of the subject on the negative plate, and, in order that the vibrations of the building or other object which serves as a support for the camera may not affect the relative adjustment of the parts of the camera and thus throw them out of proper focus or alignment, the camera stand 60, carrying the parts heretofore referred to, is mounted so that it is substantially floating and freely movable with respect to four supporting frames 70 which are fixed on the floor or other support 71. The frames 70 are arranged in pairs with those of each pair on opposite sides of the camera stand and this stand is provided on its under side with a pair of transverse axles 72 by clamps 73. These axles 72 are provided at their ends with trunnions which project into the openings of the frame 70 and these trunnions are suspended from the top members of the frame 70 by certain supporting mechanism 74 including the coil springs 74ª, as more fully described in my prior copending application above referred to, whereby the camera stand is resiliently supported on the frames 70 and retains its position and stability independently of vibrations or other disturbances which affect the support 71.

In the operation of the apparatus, the copy or subject to be reproduced by the camera is placed upon the copy board carrier 59. If this copy is carried on an opaque sheet and is to be photographed by light reflected therefrom into the lens of the camera, the copy sheet is tacked or otherwise secured on a copy board 75 which is a wooden board mounted vertically on the rear side of the carrier frame 76. This frame is provided with longitudinal grooves which are slidably engaged by tongues formed on bars 78 secured to the copy board, as shown in Fig. 1, thus permitting the copy board to be removed by sliding it sidewise transversely to the longitudinal axis of the camera. When the subject to be photographed is carried by a transparent plate or the like, the copy board 75 is removed and the transparent plate is mounted between the horizontal plate rails 77 where it is clamped in position by the clamping screws 80 shown in Fig. 10. These set screws engage the walls of channels 81 carried by the copy board or plate rail 77 and these channels receive the edges of the copy plate or the flanges carried by the rails on the rear of the copy board 75. Either the subject plate or the copy board may be moved longitudinally of the rails 77 and clamped in the desired position. The rails 77 are provided at their ends with threaded members 83 which are threadedly engaged by the vertical adjusting screws 84 journaled in bearings 85 carried by the side frame members 76ª of the supporting frame 76. Bevel gears 86 are secured to the lower ends of these adjusting screws 84 and are arranged to mesh with other bevel gears 87 fixed on a transverse shaft 88 which is journaled in bearings carried by the frame members 96ª and provided at one end with a squared portion 88ª adapted to be engaged by a crank which may be operated to effect the adjustment of the subject plate or of the copy board in a vertical plane. The lower plate holding bar 77 which is engaged by the adjusting screws 84 is provided with vertically extending rods 89 which are secured in the brackets at the ends of the bar and these rods are slidably engaged by brackets 90 at the ends of the upper plate holding bar 77 to which they may be secured by set screws 91, thus holding the bars 77 in the desired spaced relation to accommodate the copy board or subject plate of the proper size. The upper bar 77 is connected at each end to a chain 92 which passes upwardly over a pulley 93 and thence downwardly, its other end being attached to a counterweight 94 for counterbalancing the weight of the bars 77 and parts carried thereby. By turning the shaft 88 the bars 77 may be simultaneously adjusted in a vertical direction and their position is indicated by a pointer 95 on the lower bar which travels adjacent a scale 96 fixed on one of the side frame members 76ª. The rectangular supporting frame 76 is carried by a truck frame 100 which is provided at one side with grooved rollers 101 adapted to travel upon one of the upper track rails 61 and at the other side the truck is supported by a single intermediate roller 102 having a cylindrical peripheral surface which travels on the opposite track rail 61 of the camera stand, as shown in Fig. 9. Thus the truck frame of the copy board holder has a three-point support on the camera stand, and is prevented from rocking or tilting during its movement. The truck frame 100 carries two uprights or standards 105 located at opposite sides thereof and connected at their upper ends by a transverse frame member 106 thus affording a frame structure against which the supporting frame 76 of the copy board holder is mounted, as shown in Fig. 10. The rear edge of the truck frame 100 carries a grooved bar 107 and a similar grooved bar 107 is carried by two supporting members 108 which extend forwardly from the upper cross frame member 106. The opposite grooves of these bars 107 are adapted to be slidably engaged by the removable light diffusing glass plate 109. These bars 107 also have secured thereto the forwardly extending light diffusing hood 110 which is a funnel-shaped member formed preferably of sheet metal and having a light reflecting inner surface arranged to concentrate the light rays and reflect them through the subject plate, in case a subject plate is being employed instead of a copy board. When a copy board is employed with the copy or subject mounted thereon, the source of light is mounted at the rear of the copy board between the subject and the lens but when a transparent or translucent subject plate is used the light passes through the hood 110 and through the subject plate.

The upper bar 106 carried by the supporting standards 105 carries two brackets 111 having flanges 112 which project downwardly on the rear side of the flanges 113 which are formed on the upper cross frame member 76ª of the copy board supporting frame, as shown particularly in Figs. 9 and 10, thus retaining the upper portion of the frame 76 in position while permitting it to tilt or move vertically to a limited degree. The lower frame member 76ᶜ of the supporting frame is provided with two downwardly extending flanges 115 which are arranged to travel on rollers 116 carried by pivot pins 117 which are fixed in the supporting bar 118, as shown particularly in Figs. 9 and 12. The bar 118 is mounted between a plurality of pairs of lugs 119 which extend upwardly from the truck frame 100 and one end of the bar is pivoted between two of these lugs as shown at 120 so that it may be tilted about this pivot to adjust the axes of the copy board holder with respect to a horizontal line extending transversely of the camera. The end of the bar 118 opposite the pivot 120 is connected to an adjusting screw 121 having mounted thereon an adjusting nut 122, preferably of the special form described in my co-pending application above referred to. This nut 122 has an annular groove which engages a notch in the bracket 123 secured to the under side of the frame 76 by which the copy board is supported and, upon turning the nut 122, the frame 76 may be adjusted laterally of the camera on the rollers 116 for the purpose of locating the vertical axis of the subject in proper position with respect to the longitudinal axis of the camera. This position of the frame 76 is indicated by a pointer 124 mounted on the lower frame member 76ᶜ and arranged to travel in proximity to the scale 125 fixed on the bar 118.

The tilting of the bar 118 to effect a corresponding tilting of the copy board or subject plate is effected by the operation of a plunger 126, shown particularly in Fig. 11, which carries a bifurcated head 126ª at its upper end to straddle the bar 118. The plunger 176 is threaded as shown at 126ᵇ and is engaged by an adjusting nut 128 having keyed thereon a spiral gear 129 which meshes with another spiral gear 130 splined on the longitudinal shaft 131. When this shaft is rotated it causes a corresponding rotation of the sleeve 128 and a resulting vertical movement of the plunger 126. The plunger and the spiral gears are carried by a bracket 132 which is secured to the under side of the truck frame 100 and the shaft 131 is journaled in bearings carried by the camera stand 60 and by the frame 100, being extended throughout the length of the camera and having its rear end projecting through the rear end frame of the camera stand, as shown in Fig. 13, where the extremity of the shaft is squared as shown at 131$^a$ to be engaged by a crank for permitting the tilting of the copy board from a position within the dark room 55.

The movement of the copy board carrier 59 longitudinally of the camera stand is accomplished by certain mechanism including a coarse adjusting mechanism and a fine adjusting mechanism both of which are operated from the rear end of the camera within the dark room 55. The coarse adjusting mechanism comprises an endless sprocket chain 135 which is connected to brackets carried by the truck 100 of the camera stand at points 136 so that the truck frame constitutes a continuation of the endless chain. This chain 135 is passed around a sprocket gear 137 pivotally mounted in a bracket 138 carried by the truss frame 63 at the front end of the camera and at the rear end of the camera the chain 135 passes around another sprocket gear 139 which is mounted on a shaft 140 journaled in bearings carried by the rear truss frame 65 of the camera stand. A graduated tape 141 is mounted parallel to the chain 135 and is similarly connected to the truck frame 100. This tape is passed around wheels 142 at the front and rear ends of the camera, the wheel at the rear end being mounted on the shaft 140 to rotate in unison with the sprocket wheel 139. The shaft 140 is connected by bevel gears 143 with an operating shaft 144 having a squared extremity 144$^a$ adapted to be engaged by a crank for effecting the rotation of the sprocket gear 139 and the corresponding longitudinal adjustment of the copy board carrier. The approximate or rough position of the copy board carrier 59 is indicated by the graduations on the tape 141 with respect to an index mark 145 carried by the housing 146 within the dark room, as shown in Fig. 17.

The fine adjustment of the position of the copy board carrier 59 is effected by certain mechanism operated independently of the sprocket chain heretofore described and it includes a longitudinal rack bar 150 which is journaled in bearings to slide longitudinally of the camera and which is adapted to be detachably connected to the truck frame 100 of the copy board carrier by the device illustrated particularly in Fig. 16. The rack bar 150 slidably engages the housing 151 secured to the under side of the truck frame 100 and the teeth of the rack bar are adapted to be engaged by a latch member 152 which is pivoted at 153 on the bracket 151 and which is normally moved out of engagement with the rack bar by means of a coil spring 154 mounted on the pin 155. When the operator desires to employ the fine adjusting mechanism for moving the copy board carrier, the latch 152 is moved into engagement with the rack bar 150 by means of a cam 156 which is splined on a longitudinal shaft 157 arranged to be slidably engaged by bearings carried by the housing 151. The shaft 157 and the rack bar 150 are journaled in bearings carried by the camera stand 60 and are both capable of operation, when positioned in the dark room 55. The shaft 157 is provided with a crank 158 located within the dark room as shown in Fig. 13 to permit the turning thereof and the rear end of the rack bar 150 is connected to a head 160, as shown particularly in Fig. 14, where the head 160 is illustrated as being threadedly engaged by the adjusting member 161 which is journaled in a bracket 162 and which is adapted to be rotated either by the fixed hand wheel 163 or by a crank mounted on the squared extremity 161$^a$ of this adjusting member. Any lost motion in the threaded connection of the shaft 161 is taken up by springs 161$^b$ mounted on rods 161$^c$ between the head 160 and the bar 161$^d$. The approximate position of the rack bar 150 is indicated by the position of the graduations 164$^a$ carried by the scale 164 fixed on the head 160, with respect to an index mark 165 which is carried by the bracket 162 and the finer adjustment of the rack bar 150 is indicated by the micrometer disk 166 which is fixed on the adjusting member 161 adjacent the hand wheel 163 and which has graduations movable adjacent an index mark 167 on the bracket 162. After the copy board carrier has been approximately located by the operation of a crank on the shaft 144, the shaft 157 may be operated to form a driving connection between the truck frame 100 and the rack bar 150 after which the copy board carrier may be located in the precise position desired by turning the adjusting member 161.

Since the shafts 131 and 157 by which certain movements of the copy board holding frame are controlled are relatively long, it is important that they be supported between their ends to prevent sagging which might interfere with the registration of the parts during the focusing of the camera and, inasmuch as fixed bearings would interfere with the movement of the copy board holder longitudinally of the camera, certain movable bearing supports have been provided. Referring to Figs. 9 and 10, it will be seen that two transverse bearing shafts 170 are provided adjacent the intermediate position occupied by the copy board holder 59, these shafts 170 being journaled in bearings 171 which are carried by intermediate truss frames 64 of the camera stand. Each shaft 170 has fixed thereon supporting members 172 which are provided at their outer ends with semi-circular bearing members 172a adapted to engage one or the other of the shafts 131 or 157 when the arms 172 are moved to their upright positions. The shaft 170 also has fixed thereon crank arms 173 and these are pivotally connected at their outer ends by a longitudinal link 174. The ends of this link are turned downwardly so that the intermediate straight portion thereof normally lies above the upper extremities of the crank arms 173 and the link 174 is provided at the ends of the straight portion thereof with laterally projecting pins 175 each of which is adapted to be moved into the path of travel of downwardly extending fingers 176, one of which is attached to each of the front and rear edges of the truck frame 100 as shown in Figs. 9 and 10. When one of the shafts 170 is turned to cause the bearings 172a mounted thereon to support the shafts 131 and 157, as shown in Fig. 10, the carrier 59 of the copy board or subject plate is permitted to pass longitudinally of the shafts to a position between the intermediate bearing members 172a because the other set of bearing members is then depressed, due to the angular positions of the crank arms 173 on the other shaft 170. Upon continued movement of the carriage truck 100 in the direction indicated by the arrow 177 in Fig. 10, the depending trip finger 176 at the leading edge of the truck frame 100 engages the adjacent pin 175 and rocks the shafts 170 through the connecting link 174, thereby depressing the bearing members 172a in advance of the carriage and elevating the other bearing members into engagement with the shafts 131 and 157 at the rear of the carriage. In this way, the bearings for the intermediate parts of these longitudinal shafts are automatically depressed and elevated to support the shafts at all times while permitting the copy board carriers to pass over the positions occupied by them.

The lens board carrier 57 is shown more particularly in Figs. 1 and 7 where it is illustrated as comprising a platform 180 having a pair of upwardly extending standards 181 which have secured thereto the lens board 182 in which is mounted the lens 58 previously referred to. The bellows 52 is connected to the lens board around the lens and extends rearwardly therefrom to the bellows support 56. The platform 180 is adapted to slide upon the upper track members 61 of the camera stand 60, and for this purpose it is provided at one side with a pair of legs 183 having downwardly divergent bearing surfaces 183a which are adapted to contact with opposite surfaces of one of the track members 61 and thus retain the platform 180 in proper position on the camera stand. At the other side of the camera stand, the platform 180 is provided with a leg 184 having a flat bearing surface 184a which is adapted to rest upon the upper surface of the other track member 61 thus permitting some compensation for expansion of the parts without interfering with the freedom of movement of the lens board carrier. The platform 180 of the lens board carrier is adapted to be moved longitudinally of the camera stand by either a coarse adjusting mechanism or a fine adjusting mechanism, similar to that employed for the longitudinal adjustment of the copy board carrier 59. The coarse adjusting mechanism comprises the endless sprocket chain 186 and an endless tape 187 which are connected to the platform 180 and which are passed around the sprocket gears 188 and tape wheels 189, respectively, at the front end of the path of travel of the lens board and at the rear end of the camera, as shown particularly in Fig. 13. The sprocket gear 188 at the rear end of the camera is fixed on the transverse shaft 190 and this shaft is connected by bevel gears 191 with a longitudinal adjusting shaft 192 having a squared extremity 192a as shown in Fig. 17 to permit the application of a crank for effecting an adjustment of the lens board carrier to the approximate position desired. This position is indicated by the reading of the endless tape 187 with respect to a stationary index mark 191 on the housing 146 previously referred to, as shown in Fig. 17. The fine adjusting mechanism for the lens board carrier 57 comprises a longitudinally adjustable rack bar 195 which is slidable in bearings carried by the truss frames of the camera stand, as shown in Fig. 13, and which is capable of being connected to a bracket 196 on the under side of the camera stand platform 180 by means of a latch 197 normally moved out of engagement with the rack bar by a spring 198 and adapted to be moved into engagement therewith by means of a cam 199 mounted on the rotatable shaft 200. This shaft is journaled in bearings carried by the brackets 201 attached to the under side of the platform 180 and another bearing carried by the truss frames of the camera stand and its rear end is provided with a crank 202 by which the shaft may be turned to control the operation of the cam 199. The rack bar 195 is actuated by an adjusting member 204, similar in all respects to the adjusting member attached to the other rack bar 150, and adapted to be rotated either by a crank mounted on the squared extremity 204a thereof or by the manipulation of the hand wheel 205 fixed thereon. The position of the rack bar 195 is indicated by a scale 206, the graduations of which are adapted to register with respect to a stationary index mark 207, and the finer adjustments of the position of the lens board carrier are adapted to be indicated by the micrometer disc 208, the graduations of which move adjacent to a stationary index mark 209, all of which is shown particularly in Fig. 13.

The intermediate bellows support 56 is substantially rectangular in form, as shown particularly in Figs. 1 and 7, and this bellows support is adapted to be rolled on auxiliary trackways 210 which are mounted on lugs 211 extending outwardly from the track members 61. Supporting plates 212 extend downwardly from the bellows support 56 and are provided with rollers 213 which travel on these auxiliary trackways 210. This permits the bellows support to be moved to accommodate itself to the position of the lens board carrier 57.

The screen holding frame 51 which is located within the dark room 55, and between the negative holder support 50 and the dark room wall 64, is shown particularly in Figs. 1, 18, 27, 28, 29 and 30. This screen or mask support comprises a rectangular frame or housing 220 having supporting brackets or bearing members 221 along its lower side adapted to rest on the track members 61 of the camera stand, as shown in Fig. 27, the bracket 221 being provided with lower curved surfaces to conform to the surfaces of the track members 61. The upper transverse frame member of the housing 220 is provided with rearwardly projecting brackets 223 having downwardly extending flanges 223ª which are adapted to receive between them the supporting plates 224 which are carried by the negative holding structure 50, as shown in Fig. 18. These flanges are connected by studs 223ᵇ, as shown in Fig. 21, and have coil springs 223ᶜ mounted on the studs to maintain the flanges in close engagement with the flange 224. In this way, the mask or screen support 51 is normally supported between the support 50 of the negative holder and the wall 54 of the dark room but it may be elevated from that position by means of certain hoisting mechanism shown particularly in Figs. 1, 37 and 38. The upper truss member of the frame 220 of the screen support is provided with upwardly projecting plates 225 having pins 226 projecting therefrom and these pins are adapted to be engaged by the lower hooked extremities 227 of vertically adjustable rack bars 228 which are adapted to be adjusted by pinions 229 mounted on a horizontal shaft 230. This shaft is journaled in bearings carried by a traveling frame 231 which is supported by wheels 232 adapted to travel on the horizontal track 233 suspended by the members 234 from brackets 235 secured to the ceiling of the dark room 55. The shaft 230 is connected by a worm and worm wheel 236 with an operating shaft 237 having mounted thereon the grooved pulley 238 adapted to be rotated by the endless chain 239 which extends downwardly in convenient reach of the operator. After the frame 220 has been elevated by the rotation of the shaft 230, the screen support 51 may be moved laterally on the trackway 233 to permit changing of the screens or masks and the adjustment of various parts of the apparatus carried by this frame. In order to make sure that the depending hook members 227 are in engagement with the pins 226 before the hoist is operated to elevate the frame 220, the screen or mask housing 220 is provided with a latch member 235 which is mounted on an arm 236 pivoted at 237 adjacent the corner of the screen housing, as shown in Fig. 27. The latch member 235 is pivotally connected to an operating bar 238 having a pair of collars 240 and 240ª fixed thereon. When the latch member 235 is in its outer lower position to permit the detachment of the hook members 227 of the hoist, as shown in Fig. 27, the upper collar 240ª rests on a bracket 241 which is provided with a notch to receive the bar 238 but when the hook members 227 are moved into engagement with the pins 226 carried by the screen or mask housing, the latch member 235 may be moved upwardly and inwardly about the pivot 237 and the end of the latch member then engages the lower end of one of the hook members 227 as shown in Fig. 37, in which position of the parts, the lower collar 240 on the operating member may be moved into position above the bracket 241, thereby retaining the hook member 227 in engagement with the pins 226 or while the hoist is being operated to move the screen housing 220 and its contents.

The screen or mask frame or housing 220 carries a pair of parallel horizontal mask supporting bars 245 each of which is provided at its end with an internally threaded member 246 threadedly engaged by one of the vertical adjusting screws 247. These adjusting screws are journaled in bearings 248 carried by vertical supporting bars 250 and the lower ends of the adjusting screws 248 are connected by bevel gears 251 with a transverse shaft 252 having a squared extremity 252ª adapted to be engaged by a crank which may be inserted through an aperture 253 formed in the side wall of the screen housing as shown in Fig. 27. The upper and lower portions of each adjusting screw 247 are threaded in opposite directions so that upon rotation of these screws simultaneously by the operation of the shaft 252, the horizontal supporting bars 245 may be moved toward or from each other to accommodate mask or screen structures of different sizes. The vertical supporting bars 250 which carry the adjusting screws 247 are movable in unison in a horizontal direction in order to adjust the mask or screen toward or from the negative carried by the negative support 50.

This is accomplished by the mechanism described in my co-pending application previously referred to, including a horizontal shaft 255 which is journaled in the side walls of the housing 220, adjacent the lower part thereof, and which has crank arms 256 pivotally connected with the vertically slidable bars 257. These bars 257 are pivotally connected at their upper ends to other crank arms 258 which are pivoted at 258ª on the side walls of the housing 220. The bars 257 slide vertically in guides 259 carried by the vertical supporting members 250 and these vertical supporting members 250 are provided with plates 260 which slide in horizontal guideways 261 carried by the side frame members of the housing 220 so that upon vertical movement of the adjusting bars 257, the vertical supporting bars 250 move horizontally as permitted by the sliding of the blocks 260 in the guideways 261. The cranks 256 and 258 are so arranged that when the shaft 255 is rotated to effect this horizontal adjustment of the supporting members 250, all parts of these bars 250 move together and maintain the horizontal supporting bars 245 in vertical planes. The angular movement of the shaft 255 is effected by a handle 262 located on the outside of the screen housing, as shown in Fig. 1, and carrying a pointer 263 movable over a scale 264. The limit of movement of the crank arm or handle 262 may be determined by an adjustable stop screw 265.

The horizontal supporting bars 245 are adapted to carry a rectangular mask frame or plate 270 shown particularly in Figs. 28, 29 and 30. The mask frame 270 is in the form of a rectangular flat plate having an inner rectangular opening 271 therein and the upper and lower edges of this mask frame are adapted to be supported by holding devices 272 which are mounted on the bars 245, as shown particularly in Figs. 30, 33, 34, 35 and 36. Each holding device 272 comprises a block 273 mounted on a bar 274 and separated from a complementary clamping member 275 so that the edge of the mask frame 270 may be received between them. Each block 273 is connected to its clamping member 275 by two adjusting screws 276 and the edges of the mask frame 270 are notched out as shown at 277 to receive these adjusting screws 276 when the edges of the frame 270 are passed into engagement with the bars 274. The bars 274 rest upon the flanges of the T-shaped bars 245, as shown in Fig. 34, and are provided with lugs 278 projecting through notches 279 formed in the flanges of these bars 245 so that the positions of the bars 274 on the flanges 278 may be regulated by the operation of adjusting screws 280 having stems 280ª which are rotatably mounted in the webs of the bars 245 and having squared extremities 280ª adapted to be en- gaged by a wrench or the like. In this way, the bars 274 which carry the holding devices 272 may be adjusted on the supporting bars 245 and the ends of the bars 274 may be independently adjusted in order to vary the plane of the masking device with respect to a plane at right angles to the longitudinal axis of the camera. The mask carried by the frame 270 comprises upper and lower flexible curtains 282 which are mounted on rollers 283 having their ends journaled in bearings 284 carried by the mask frame adjacent the opening 271 therein. These rollers are similar to ordinary curtain rollers and the curtains 282 pass from these rollers through the opening 271 and thence over guide rollers or bars 285, as shown in Fig. 30, from which the curtains extend vertically toward each other and have their edges attached to parallel bars 286. These bars are attached to brackets 287 which are adjustable vertically on guide rods 288 extending between brackets 289 attached to the mask frame 270. Flat springs 290 are mounted on the brackets 287 to bear against the supporting guide rods 288 and the brackets 287 may be clamped in adjusted position on these rods by the clamping screws 291.

The bars 286 are connected together by rods 292 which engage ears 293 carried at the ends of these bars and the ears are secured in adjusted position on the rods 292 by means of set screws 294, as shown particularly in Fig. 28. The bars 286 are provided along their opposed edges with grooves 295 which are adapted to receive shutter plates 296. These shutter plates are adapted to slide into the grooves 295, from opposite sides of the mask frame, thus leaving an opening 297 between the shutter plates and between the curtains 282, through which the light passes from the bellows to the negative plate carried by the holder 50. The bars 286 are further provided with adjustable marginal plates 298 which are mounted thereon by means of screws 299 engaging slots 300, which are elongated to permit limited vertical movement of the marginal plates 298 for the purpose of regulating the projection of these plates beyond the edges of the bars 286. Flat springs 301 are mounted on the marginal plates 298 to bear against the bars 286 and thus provide frictional resistance to retain the marginal plates 298 in adjusted position with respect to the screws 299. In the making of multiple negatives, these marginal plates 298 may be shifted to cut out border portions of the subjects or copy to be reproduced in order that adjacent units of the multiple reproduction will connect properly with each other along their marginal edges. The shutter plates 296 may be adjusted inwardly or outwardly for the same purpose and it will be understood that both the curtains and the shutter plates may be adjusted to regulate the size of the opening 297 as desired. When this opening has been determined, the clamping screws 291 may be released to permit the simultaneous vertical adjustment of both the bars 286 and of both of the connected curtains 282, due to the fact that the bars 286 are connected by the rods 292. The frame 270 of the masking device is provided with curved shields 303, as shown in Fig. 29, which are secured along the vertical edges of the opening 271 and project inwardly with their edges terminating adjacent the vertical portions of the curtains 282.

There is provided around the mask frame 270 a light excluding plate or screen 305 having a rectangular central opening 306 which is slightly smaller than the outer dimensions of the frame 270, so that the inner edges of the plate 305 overlap the outer edges of the plate 270, as shown particularly in Figs. 28 and 30. The light excluding plate 305 is provided with resilient pads 307 of felt or other suitable material around the edges of the opening 306 and these pads are adapted to bear against the frame 270, so that light is excluded around the edges of the mask frame. By rocking the handle 262 to effect a horizontal adjustment of the bar 245, the mask frame 270 may be caused to bear against the pads 307. The light excluding plate 305 is shown more particularly in Figs. 3 and 4, where it is shown as a rectangular plate having along its lateral edges the transverse flanges 308 provided with undercut hooked notches 309. These flanges are adapted to extend on the sides of the mask or screen carrying frame 220 and are adapted to be engaged by pins 310 which enter the undercut notches 309, thus holding the light excluding plate in position. The plate 305 may preferably be mounted on the screen or mask frame structure 220 when this frame has been withdrawn from the camera by the hoisting mechanism previously described.

The negative plate carrying frame 50 and its associated parts are shown more particularly in Figs. 1, 2, 17, 18, 20, 21, 22, 23, 24, 25 and 26. The negative supporting structure 50 comprises two upwardly extending standards 315 which are secured to a base member 316 carried by the camera stand 60. The standards 315 are connected at their upper ends by a transverse member 317 which carries forwardly projecting brackets having mounted thereon the flanges 324 previously described, by which the screen carrying frame 220 is connected to the negative supporting structure when mounted in the camera. This supporting structure, including the standards 315 and the transverse bar 317, is adapted to support a rectangular negative carrying frame 318 shown more particularly in Fig. 20, having upwardly extending side frame members 318$^a$, a lower transverse frame member 318$^b$, and an upper transverse frame member 318$^c$. The lower bar 318$^b$ is provided with a pair of depending flanges 319 which form track members adapted to travel on rollers 320 mounted on pins 321 which are carried by lugs 322 extending upwardly from the base member 316 between the lower parts of the standards 315. Clips 323 are provided for retaining the track flanges 319 in engagement with the rollers as shown in Fig. 18, and this arrangement permits the supporting frame 318 to be adjusted laterally with respect to the supporting standards 315 and with respect to the longitudinal center line of the camera. The upper transverse frame member 318$^c$ is provided with other upwardly extending flanges 324 which project upwardly and are guided by the flanges 224 carried by the transverse bar 317 of the supporting structure, so that the frame 318 is guided and supported in its lateral travel. This lateral adjustment of the frame 318 on the rollers 320 is effected by an adjusting screw 325 which is attached to one of the standards 315 and which is engaged by an adjusting nut 326, as shown in Fig. 17. This adjusting nut has an annular groove which is engaged by a flange 327 carried by a bracket 328 projecting out from one of the side frame members 318$^a$ of the supporting frame, so that when the adjusting nut is rotated a lateral movement of the frame 318 is effected with respect to the supporting standards and with respect to a graduated scale 329. This scale is mounted on one of the bars by which the rollers 320 are carried and is adapted to move in proximity to an index mark 330 carried by the lower frame member 318$^b$.

The holding frame 318 is provided with a pair of holding bars 331 which extend horizontally between the side frame members 318$^a$. These bars are adapted to support the negative plate in the manner hereinafter described and are capable of vertical adjustment with respect to the frame 318. For this purpose, the ends of the lower bar 331 are provided with brackets 332 which are threadedly engaged by vertical adjusting screws 333 having bearings in blocks 334 which are carried by the side frame members 318$^a$. The lower ends of these adjusting screws are connected by a bevel gear 335 with a horizontal adjusting shaft 336 which extends through the side of the frame where it is engaged by a crank 337. The lower bar 331 is adjustably connected to the upper bar 331 by means of rods 338 which are fixed in a lower bar and which are slidably engaged by brackets 339 fixed on the ends of the upper bar. Set screws 340 are provided for clamping the rods 338 in the brackets 339 so that the bars 331 may be spaced predetermined distances apart as desired. The upper bars 331 are connected to chains 341 which pass upwardly over pulleys 342 and thence downwardly, the other ends being connected to counterweights 343.

By this arrangement, the bars 331, carrying the negative holding frame, may be adjusted vertically by the operation of the crank 337 and the coarser degrees of movement may be indicated on a graduated scale 344 which is fixed in stationary position and which is adapted to be read in connection with a movable pointer 345 mounted on one of the rods 338 and capable of being adjusted to different stationary positions on that rod. Finer degrees of movement of the supporting bars 331 may be read on a micrometer disk 346 having its graduations moving in proximity to an index mark 347, as shown in Figs. 20 and 22, a micrometer plate 347$^a$ being capable of being clamped in position by means of a screw 347$^b$ engaging the shaft of the driving gear 348 which meshes with a pinion 349 secured on the shaft of one of the adjusting screws 333. This finer adjustment of the screws 333 is preferably brought about by the arrangement shown particularly in Figs. 5, 6 and 20 where the transverse adjusting shaft 336 is shown as being provided with a relatively fixed worm wheel 350 which is adapted to mesh with a worm 351 fixed on an adjusting shaft 352 carrying the hand wheel 353 and provided with a squared extremity 354 adapted to be engaged by a crank. The shaft 352 is journaled in a channel-shaped supporting member 355, which is pivoted at 356 to one of the lugs 357 which extend upwardly from the lower frame member 318$^b$ of the supporting member. The other end of the channel-shaped supporting member 355 is engaged by coil springs 358 which rest on another lug 357 carried by the frame, so that the member 355 is normally forced upwardly to move the worm out of driving engagement with the worm wheel, but when it is desired to make use of this fine adjusting mechanism, the supporting member 355 may be pushed downwardly to cause the worm and worm wheel to mesh and may be locked in that position by means of a latch member 360 having a notch 360$^a$ adapted to be engaged by a stationary pin 361 projecting from the adjacent lug 357.

The mechanism described above comprises means including the adjusting screw 326 for effecting a limited lateral adjustment of the frame 318 by which the negative plate is carried and it provides means for effecting a relatively large movement of the negative holding bars 331 in a vertical direction with means for indicating either fine or coarse movement of those bars. While this vertical adjustment is sufficient for permitting the photography of a plurality of subjects or sub-ject-units on the negative plate, the limited lateral adjustment heretofore described would not ordinarily be sufficient to serve the purposes of multiple reproduction, and means have therefore been provided for supporting the negative frame on the holding bars 331 in such a way as to permit the lateral movement of the negative frame in a direction longitudinally of these bars, thus accomplishing the purpose of displacing the negative plate laterally to accommodate multiple reproduction of a subject without unbalancing the camera by shifting relatively large weights, such as that represented by the frame 318, laterally of the focal axis of the camera.

Each of the holding bars 331 of the negative supporting frame 318 is substantially angle-shaped in cross section, as shown in Fig. 18, and carries as a part thereof a reversely located angle bar 331$^a$ which is somewhat undercut on the horizontally directed flange so that negative plates may be mounted directly therein as explained in my prior co-pending application. The present invention, however, contemplates the use of an auxiliary holding bar 365 shown more particularly in Figs. 24 and 25. This bar 365 is located in position on the lower supporting bar 331 by means of register pins 366 which engage holes in the under side of the bar, as shown in Fig. 24, and the bar 365 is secured to the supporting bar 331 by means of screws 367. The bar 365 extends laterally of the machine some distance beyond one of the side frame members 318$^a$ of the rectangular supporting frame and is adapted to allow the movement thereon of another member by which the negative frame is directly carried. For this purpose, there is provided a movable supporting bar 370 which is carried by a pair of blocks 371 secured thereto by studs 371$^a$ and provided at their lower ends with notches 372 which are adapted to conform to the shape of the upper edge of the bar 365 upon which they slide. One wall of the notch 372 is inclined as shown at 372$^a$ and the bar 365 is provided with a correspondingly inclined surface so that the blocks 371 seat securely on the bar 365 and are retained in position thereon by means of holding plates 374 secured to the lower ends of the blocks 371 by means of studs 375, as shown in Fig. 25. The plates 374 engage the longitudinal groove 376 which is formed in the side of the bar 365. The blocks 371 and the movable supporting bar 370 are adjusted longitudinally of the auxiliary bar by means of an adjusting screw 377 which is journaled in bearings 378 carried by the bar 365 and which threadedly engages one of the blocks 371. In order that any lost motion in this threaded connection may be compensated for, an auxiliary block 379 is mounted on the screw 377 and secured against relative rotation with respect to the adjacent block 371 by means of a pair of pins 380 which engage apertures 381 formed in the block 371. Coil springs 382 are mounted on these pins to force the auxiliary block 379 away from the block 371 and thus maintain a tight engagement of both members with the threads of the adjusting screw. The outer unthreaded portion of the adjusting screw is provided with a squared extremity 377ª adapted to be engaged by a wrench and a micrometer disk 383 is mounted adjacent thereto for registration with an index mark 384 carried by a collar 384ª mounted in stationary position on one of the bearings 378. The coarse adjustment of the bar 370 is indicated by the position of an index mark 384ᵇ carried by one of the blocks 371 with respect to a graduated scale 384ᶜ fixed on the bar 365. By this means the blocks 371 and the movable supporting bar 370 may be adjusted longitudinally of the auxiliary supporting bar 365 for the purpose of effecting a sufficient degree of lateral movement of the negative to allow for the multiple reproduction of a subject. The movable supporting bar 370 is provided with a groove 370ª on its upper side, as shown in Fig. 25, to be engaged by the lower edge of the negative frame 385 which is retained against movement longitudinally of the bar 370 by a dowel pin 385ª secured to the bar 370 and engaging a dowel hole formed in a plate 385ᵇ set into the bottom of the negative frame. This frame is rectangular in form and is provided with a central aperture in which the negative 386 is located. The negative is mounted in the opening and rests against a flange 387 on the lower bar of the frame while the upper edge of the negative rests against another similar flange 388 formed on the upper bar of the negative frame. The negative is retained in engagement with the flange 388 by means of the spring fingers 389 which may be swung out of position to release the plate. The upper part of the negative frame 385 is provided with a pair of rollers 390 which are adapted to travel on the depending flange 331ᵇ of the upper supporting bar during the lateral adjustment of the negative frame by the operation of the adjusting screw 377. The rollers 390 are maintained in engagement with the upper supporting bar 381 by the flat springs 391 which are secured to the movable supporting bar by means of screws 392 and which may be swung about these screws to the position illustrated in Fig. 24 where they are shown as bearing against the negative frame 385. The upper supporting bar 381 may also be provided with the finger bar 393 having the spring fingers 394 thereon, as described in my prior application above referred to, so that this bar may be swung downwardly about its pivot to cause the fingers to engage a negative or a negative frame, in case it is desired to mount the negative directly between the bars 331 when using the camera for ordinary photographic purposes, as distinguished from multiple reproduction.

In the use of the camera for multiple reproduction, the copy sheet may be mounted upon the copy board, in case the subject is carried by an opaque sheet, and the parts of the camera are then adjusted to effect the successive reproduction of the subject at intervals over the surface of the negative mounted in the frame 385. The copy sheet 395 is shown in Fig. 9 where it is illustrated as being attached to the wooden copy board and provided with a subject 396. The copy sheet 395 bears register marks 397 by which the sheet may be accurately located on the copy board with reference to the focal axis of the camera, this location being effected in the preliminary adjustment of the apparatus, for example, by the use of a suitable plate mounted between the bars 331 of the negative holder 318. After the subject or copy sheet has been properly located on the copy board and the copy board adjusted to secure the proper positioning of the vertical and transverse lines of the copy sheet, the copy board may be adjusted longitudinally of the camera and the proper adjustment of the lens may be effected to bring about the desired reduction of the subject when projected through the mask to the negative plate. The parts of the mask are adjusted to confine the projected image to a desired area of the negative plate and the negative plate is initially so located that the image of the subject is confined to within certain boundaries of the negative. After an exposure has been made with the negative so located that the image of the subject is projected upon a predetermined area of the negative, the negative may be shifted laterally or vertically, by the apparatus heretofore described, in order to effect the projection of the image upon another area of the negative where a new exposure is to be made. In this way successive repetitions of the photographic process may be made in order to repeat the image at desired points over the surface of the negative until the desired multiple reproduction is effected. In Fig. 8 of the drawings, there is illustrated the negative plate having located thereon a number of images 398 which have been produced by projection from the subject 396 carried by the copy sheet. One of these images 398ª is shown in full lines representing its sharp appearance when the light is passing therethrough from the bellows and lens of the camera while the other more indistinctly represented images 398ᵇ are intended to be those which have been previously formed on the negative plate by previous exposures in the camera. It will be noted that there is formed around each unit 398 of the composite multiple reproduction, a border 399 which is uniform in width along the edge of each unit. Inasmuch as the border around the subject 396 on the copy sheet is of uniform width around the edges and it is desired to secure the same effect after a number of units of this subject have been reproduced on the negative plate, it is apparent that portions of the border must be cut out in the photographic process so that they will not be reproduced on the negative. These "trim" portions of the border are cut off by the use of the marginal screen plates and the lateral adjustable screen plates of the mask which are capable of manipulation, as heretofore described, so that desired portions at the margin of the subject may be cut out when the subject is projected to the lens onto the negative plate. By eliminating the desired trim portions of the border in each position of the negative, it will be apparent that the composite image finally appearing on the negative will have the appearance shown in Fig. 8 with a border of uniform width passing between adjacent images and around the group of images and this is effected by trimming out certain border portions which project beyond the dotted lines 400 appearing in Fig. 8 on certain edges of the subject beneath the exposure.

At the rear end of the camera within the dark chamber there is provided a lifting jack or toggle 401, like that described in my copending application above referred to, for the purpose of elevating the camera stand 60 and the parts carried thereby off of the coil springs by which they are normally suspended at the rear end of the camera, so that this end of the stand 50 will be relatively rigid during the operation of placing the mask frame in position and during the operation of removing it from the camera by the hoisting apparatus heretofore described.

From the foregoing description of the construction and operation of the separate parts of the camera it is thought that the nature of the invention and the operation of the various features will be apparent without further explanation.

Although one form of the invention has been shown and described by way of illustration it will be understood that it may be constructed in various other embodiments within the scope of the appended claims.

I claim:

1. The combination in a camera, of a copy carrier, a lens, a masking device, a plate holder, means for adjusting said masking means to confine the image projected through said lens, and operating mechanism for adjusting a negative plate horizontally and vertically with said plate holder stationary to position different portions of the negative plate to receive the image projected through said masking means.

2. The combination in a camera, of a copy carrier, a lens, means for adjusting said copy carrier longitudinally of the focal axis of said lens, means for adjusting said copy carrier transversely of said focal axis, a negative plate holder, masking means, means for positively and accurately adjusting said masking means to define the boundaries of the image projected through said lens, and means for adjusting a negative plate laterally and vertically in said plate holder for positioning different parts of said negative to receive the image projected through said masking means.

3. The combination in a projection camera, of a copy carrier, a lens carrier, a plate-holding frame, a mask supporting frame mounted between said lens carrier and said plate-holding frame, masking means mounted in said frame and having an opening, means for positively and accurately adjusting said masking means bodily in said masking frame to vary the location of said opening, and means for positively and accurately adjusting a negative plate laterally and vertically with respect to said plate-holding frame.

4. The combination in a projection camera, of a copy carrier, a lens carrier, a plate-holding frame, a mask supporting frame mounted between said lens carrier and said plate-holding frame, masking means mounted in said frame and having an opening, means for adjusting said masking means bodily in said masking frame to vary the location of said opening, means for positively adjusting a negative plate laterally and vertically within said plate-holding frame, and means for adjusting the size of the opening of said masking means.

5. The combination in a projection camera, of a copy carrier, a lens carrier, a plate-holding frame, a mask supporting frame mounted between said lens carrier and said plate-holding frame, masking means mounted in said frame and having an opening, means for adjusting said masking means bodily in said masking frame to vary the location of said opening, means for positively adjusting a negative plate laterally and vertically within said plate-holding frame, and additional means for effecting a lateral adjustment of said plate-holding frame.

6. The combination in a camera of a subject carrier, a lens, a mask holding frame, masking means carried by said masking frame and having an adjustable opening, a plate-holding frame, plate supporting means mounted in said plate-holding frame and adjustable vertically therein, and auxiliary plate supporting means carried by said first-plate supporting means and adjustable named supporting means and adjustable thereon horizontally in a direction transversely of the focal axis of said lens.

7. The combination in a camera of a subject carrier, a lens, a mask holding frame, masking means carried by said masking frame and having an adjustable opening, a plate-holding frame, plate supporting means mounted in said plate-holding frame and adjustable vertically therein, auxiliary plate supporting means carried by said first-named supporting means and adjustable thereon supporting means and adjustable thereon horizontally in a direction transversely of the focal axis of said lens, and means for adjusting said first-named supporting means vertically in said frame.

8. The combination in a camera of a subject carrier, a lens, a mask holding frame, masking means carried by said masking frame and having an adjustable opening, a plate-holding frame, plate supporting means mounted in said plate-holding frame and adjustable vertically therein, auxiliary plate supporting means carried by said first-named supporting means and adjustable thereon horizontally in a direction transversely of the focal axis of said lens, means for adjusting said first-named supporting means vertically in said frame, and means for adjusting said plate-holding frame horizontally in a direction transversely of the focal axis of said lens.

9. The combination in a camera of a plate-holding frame, a horizontal supporting bar mounted in said frame, an auxiliary supporting bar detachably mounted on said first-named bar and extending longitudinally thereof, a traveling bar slidably mounted on said auxiliary supporting bar, graduated means for effecting the adjustment of said traveling bar longitudinally of said auxiliary bar, and means for mounting a negative frame on said traveling bar.

10. The combination in a camera of a plate-holding frame, a horizontal supporting bar mounted in said frame, an auxiliary supporting bar detachably mounted on said first-named bar and extending longitudinally thereof, a traveling bar slidably mounted on said auxiliary supporting bar, graduated means for effecting the adjustment of said traveling bar longitudinally of said auxiliary bar, means for mounting a negative frame on said traveling bar, a second supporting bar carried by said plate-holding frame, and rollers mounted on said negative frame for coacting with said last-named bar during the adjustment of said traveling bar.

11. The combination in a camera of a plate-holding frame, a horizontal supporting bar mounted in said frame, an auxiliary supporting bar detachably mounted on said first-named bar and extending longitudinally thereof, a traveling bar slidably mounted on said auxiliary supporting bar, graduated means for effecting the adjustment of said traveling bar longitudinally of said auxiliary bar, means for mounting a negative frame on said traveling bar, a second supporting bar carried by said plate-holding frame, rollers mounted on said negative frame for coacting with said last-named bar during the adjustment of said traveling bar, and means for adjusting said first and said last-named supporting bars vertically in said plate-holding frame.

12. The combination in a camera of a supporting frame, a masking frame carried by said supporting frame and having an opening therein, adjustable masking devices carried by said masking frame for regulating the size of said opening, and auxiliary masking means for regulating the marginal portions of said opening.

13. The combination in a camera of a supporting frame, supporting bars carried by said frame, a masking frame carried by said bars and having an opening therein, means for adjusting the size and position of said opening, and light-excluding means carried by said supporting frame for preventing the passage of light around the outer edges of said mask-holding frame.

14. The combination in a camera of a supporting frame, a mask frame carried by said supporting frame and having an opening therein, means for adjusting the size and position of said opening, and a light-excluding plate carried by said supporting frame and having an opening therein, the portions of said light-excluding means around said last-named opening overlapping the marginal edges of said mask frame.

15. The combination in a camera of a supporting frame, a mask frame carried by said supporting frame and having an opening therein, means for adjusting the size and position of said opening, a light-excluding plate carried by said supporting frame and having an opening therein, the portions of said light-excluding means around said last-named opening overlapping the marginal edges of said mask frame, and resilient means carried by said light-excluding means around the opening therein for engaging said mask frame.

16. The combination in a camera of a supporting frame, a mask frame carried by said supporting frame and having an opening therein, means for adjusting the size and position of said opening, a light-excluding plate carried by said supporting frame and having an opening therein, the portions of said light-excluding means around said last-named opening overlapping the marginal edges of said mask frame, resilient means carried by said light-excluding means around the opening therein for engaging said mask frame, and means for moving said mask frame toward and from said light-excluding means.

17. The combination in a camera of a supporting frame, a mask frame carried by said supporting frame and having an opening therein, a pair of shutters mounted on said mask frame at opposite sides of said opening, means for adjusting the edges of said shutters toward and from each other, and auxiliary masking means carried by the edges of said shutters and adjustable thereon for further regulating the size of the opening in said masking frame.

18. The combination in a camera of a supporting frame, a mask frame carried by said supporting frame and having an opening therein, a pair of curtains mounted on opposite sides of said opening, means for adjusting said curtains to restrict the size of said opening in one direction, a pair of shutters carried by the edges of said curtains and adjustable longitudinally of said edges for restricting the size of said opening in another direction, and means for securing said curtains and said shutters in adjusted position.

19. The combination in a camera of a supporting frame, a mask frame carried by said supporting frame and having an opening therein, a pair of curtains mounted on opposite sides of said opening, means for adjusting said curtains to restrict the size of said opening in one direction, a pair of shutters carried by the edges of said curtains and adjustable longitudinally of said edges for restricting the size of said opening in another direction, means for securing said curtains and said shutters in adjusted position, and marginal plates adjustably mounted at the edges of said curtains for defining the margins of said opening.

20. The combination in a camera of a supporting frame, a mask frame carried by said supporting frame and having an opening, a pair of curtains mounted on said mask frame for adjusting the size of said opening in one direction, means for securing the edges of said curtains in fixed spaced relation, and means for effecting the simultaneous adjustment toward and from each other of the spaced marginal edges of said curtains.

21. The combination in a camera of a supporting frame, a mask frame carried by said supporting frame and having an opening, a pair of curtains mounted on said mask frame for adjusting the size of said opening in one direction, means for securing the edges of said curtains in fixed spaced relation, means for effecting the simultaneous adjustment of the spaced marginal edges of said curtains, and means carried by the marginal edges of said curtains and adjustable longitudinally thereof for regulating the size of said opening in a direction parallel to said edges of said curtains.

22. The combination in a camera of a supporting frame, a mask frame carried by said supporting frame and having an opening, a pair of curtains mounted on said mask frame for adjusting the size of said opening in one direction, means for securing the edges of said curtains in fixed spaced relation, means for effecting the simultaneous adjustment of the spaced marginal edges of said curtains, means carried by the marginal edges of said curtains and adjustable longitudinally thereof for regulating the size of said opening in a direction parallel to said edges of said curtains, and additional marginal plates carried by the edges of said curtains and extending longitudinally thereof for defining the margins of said opening at the edges of said curtains.

In testimony whereof I have subscribed my name.

ALEXANDER T. KOPPE.